(12) United States Patent
Lim et al.

(10) Patent No.: US 7,961,215 B2
(45) Date of Patent: Jun. 14, 2011

(54) SMART TASK-DRIVEN VIDEO COLLECTION

(75) Inventors: Ser-Nam Lim, Hopkinton, MA (US);
Anurag Mittal, Plainsboro, NJ (US);
Larry Davis, Potomac, MD (US)

(73) Assignee: Siemens Corporation, Iselin, NJ (US)

( * ) Notice: Subject to any disclaimer, the term of this patent is extended or adjusted under 35 U.S.C. 154(b) by 1189 days.

(21) Appl. No.: 11/649,393

(22) Filed: Jan. 3, 2007

(65) Prior Publication Data

US 2007/0222553 A1 Sep. 27, 2007

Related U.S. Application Data

(60) Provisional application No. 60/756,004, filed on Jan. 4, 2006.

(51) Int. Cl.
*H04N 7/18* (2006.01)
*G05B 15/00* (2006.01)
(52) U.S. Cl. .......................... 348/143; 340/3.1
(58) Field of Classification Search .................... 348/143
See application file for complete search history.

(56) References Cited

U.S. PATENT DOCUMENTS

| | | | | |
|---|---|---|---|---|
| 7,555,658 B2* | 6/2009 | Vahid et al. | .................. | 713/300 |
| 2006/0288346 A1* | 12/2006 | Santos et al. | .................. | 718/102 |

OTHER PUBLICATIONS

I. Stamos and P. Allen, "Interactive sensor planning," in *Computer Vision and Pattern Recognition Conference*, Jun. 1998, pp. 489-494.
Steven Abrams, Peter K. Allen, and Konstantinos A. Tarabanis, "Dynamic sensor planning.," in *ICRA* (2), 1993, pp. 605-610.
Steven Abrams, Peter K. Allen, and Konstantinos Tarabanis, "Computing camera viewpoints in an active robot work cell," *International Journal of Robotics Research*, vol. 18, No. 2, Feb. 1999.
Anurag Mittal and Larry S. Davis, "Visibility analysis and sensor planning in dynamic environments," in *European Conference on Computer Vision*, May 2004.
K.N. Kutulakos and C. R. Dyer, "Global surface reconstruction by purposive control of observer motion," in *IEEE Conference on Computer Vision and Pattern Recognition*, Seattle, Washington, USA, Jun. 1994.
K.N. Kutulakos and C. R. Dyer, "Occluding contour detection using affine invariants and purposive viewpoint control," in *IEEE Conference on Computer Vision and Pattern Recognition*, Seattle, Washington, USA, Jun. 1994.
K.N. Kutulakos and C. R. Dyer, "Recovering shape by purposive viewpoint adjustment," *International Journal of Computer Vision*, vol. 12, No. 2, pp. 113-136, 1994.
K.N. Kutulakos, "Affine surface reconstruction by purposive viewpoint control," in *International Conference on Computer Vision*, Boston, Massachusetts, USA, Jun. 1995.

* cited by examiner

*Primary Examiner* — Andy S. Rao
*Assistant Examiner* — Hee-Yong Kim
(74) *Attorney, Agent, or Firm* — Donald B. Paschburg

(57) ABSTRACT

A multi-camera system that collects images and videos of moving objects in dynamic and crowded scenes, subject to task constraints is disclosed. The system constructs "task visibility intervals" comprising information about what can be sensed in future time intervals. Methods for constructing these intervals applying prediction of future object motion and including consideration of factors such as object occlusion and camera control parameters are also disclosed. Using a plane-sweep algorithm, these atomic intervals can be combined in a method to form multi-task intervals, during which a single camera can collect videos suitable for multiple tasks simultaneously. Methods for fast camera scheduling that yield solutions within a small constant factor of an optimal solution are also disclosed.

13 Claims, 16 Drawing Sheets

| Distance from sink | Source | node₁ | node₂ | node₃ | node₄ |
|---|---|---|---|---|---|
| 1 | X | merit=0 | merit=0 | merit=0 | merit=0 |
| 2 | merit=2 → node₁ {T₁, T₂} | merit=4 → node₃ {T₁, T₂, T₃, T₄} | merit=4 → node₄ {T₂, T₃, T₅, T₆} | merit=4 → node₄ {T₃, T₄, T₅, T₆} | X |
| 3 | merit=4 → node₁ {T₁, T₂, T₃, T₄} | merit=6 → node₃ {T₁, T₂, T₃, T₄, T₅, T₆} | merit=5 → node₃ {T₂, T₃, T₄, T₅, T₆} | X | X |
| 4 | merit=6 → node₁ {T₁, T₂, T₃, T₄, T₅, T₆} | merit=6 → node₂ {T₁, T₂, T₃, T₄, T₅, T₆} | X | X | X |

FIG. 13

| Distance from sink | Source$_1$ | Source$_2$ | node$_1$ | node$_2$ | node$_3$ | Sink$_1$ | Sink$_2$ |
|---|---|---|---|---|---|---|---|
| 1 | X | X | X | X | X | → Sink | |
| 2 | X | X | → Sink$_1$ {T$_1$, T$_2$, T$_3$} | → Sink$_1$ {T$_3$, T$_4$} | → Sink$_2$ {T$_1$, T$_2$, T$_3$} | X | X |
| 3 | → node$_2$ {T$_3$, T$_4$} | → node$_3$ {T$_1$, T$_2$, T$_3$} | X | X | X | X | → Source$_1$ {T$_3$, T$_4$} |
| 4 | X | X | X | X | → Sink$_2$ {T$_1$, T$_2$, T$_3$, T$_4$} | X | X |
| 5 | X | X | X | X | X | X | X |
| 6 | → node$_3$ {T$_1$, T$_2$, T$_3$, T$_4$} | X | X | X | X | X | X |

FIG. 14

| Distance from sink | Source1 | Source2 | node1 | node2 | node3 | Sink1 | Sink2 |
|---|---|---|---|---|---|---|---|
| 1 | X | X | X | X | X | → Sink | → Sink |
| 2 | X | X | → Sink1 $\{T_1, T_2, T_3\}$ | → Sink1 $\{T_3, T_4\}$ | → Sink2 $\{T_1, T_2, T_3\}$ | X | X |
| 3 | → node1 $\{T_1, T_2, T_3\}$ | → node3 $\{T_1, T_2, T_3\}$ | X | X | X | X | X |
| 4 | X | X | X | X | X | X | → Source1 $\{T_1, T_2, T_3\}$ |
| 5 | X | X | X | X | → Sink2 $\{T_1, T_2, T_3\}$ | X | X |
| 6 | → node3 $\{T_1, T_2, T_3\}$ | X | X | X | X | X | X |

SMART TASK-DRIVEN VIDEO COLLECTION

CROSS-REFERENCE TO RELATED APPLICATIONS

This application claims the benefit of U.S. Provisional Application No. 60/756,004 filed Jan. 4, 2006, which is incorporated herein by reference.

BACKGROUND OF THE INVENTION

The present invention relates to vision systems. More in particular it relates to camera scheduling in vision systems.

Vision systems are increasingly being deployed to perform many complex tasks such as gait or face recognition. While improved algorithms are being developed to perform these tasks, it is also imperative that data suitable for these algorithms is acquired—a nontrivial task in a dynamic and crowded scene. A multi-camera system that collects images and videos of moving objects in such scenes, is subject to task constraints. The system constructs "task visibility intervals" that contain information about what can be sensed in certain future time intervals. Constructing these intervals requires prediction of future object motion and consideration of several factors such as object occlusion and camera control parameters. Although cameras can be scheduled based on the constructed intervals, looking for an optimal schedule is a typical NP-complete problem. There is also a lack of exact future information in a dynamic environment.

Accordingly novel methods for fast camera scheduling that take particular constraints into consideration and yield solutions that can be proven to be within a certain factor of an optimal solution are required.

SUMMARY OF THE INVENTION

One aspect of the present invention presents a novel method and system that provide for rapid scheduling of multitasks of a plurality of cameras.

In accordance with another aspect of the present invention a method for processing a plurality of tasks on a plurality of objects by a plurality of cameras with suitable pan tilt zoom (PTZ) settings in a vision application is provided.

In accordance with a further aspect of the present invention a method wherein atomic TVIs of different tasks are combined into a Multiple Tasks Visibility Interval (MTVI) for a camera is provided.

In accordance with another aspect of the present invention a method wherein all MTVIs for a camera are determined by applying a plane sweep algorithm is provided.

In accordance with a further aspect of the present invention a method for scheduling of one camera based on a determined set of MTVIs and atomic TVIs to optimize coverage of tasks is provided.

In accordance with another aspect of the present invention a method for scheduling of a plurality of cameras by applying a greedy algorithm is provided.

In accordance with a further aspect of the present invention a method for scheduling of a plurality of cameras based on a branch and bound algorithm is provided.

In accordance with another aspect of the present invention, a system including a processor and software operable on the processor to perform the previously stated tasks is provided.

DESCRIPTION OF THE DRAWINGS

FIG. 13 is a dynamic programming table.
FIG. 14 is another dynamic programming table.
FIG. 15 is another dynamic programming table.

DESCRIPTION OF A PREFERRED EMBODIMENT

Figure 1:
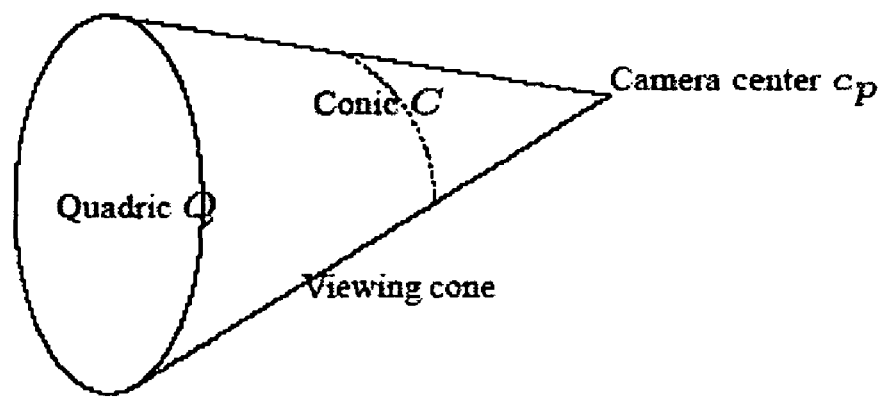
FIG. 1 is a diagram of a viewing cone for an object.

A sensor planning system for controlling a collection of surveillance cameras to acquire video sequences of moving objects (people, vehicles), subject to visibility, ground resolution and positional constraints will be presented according to one aspect of the present invention. The problem of camera control is motivated by the following surveillance scenario: Initially a collection of calibrated surveillance cameras is provided. The cameras must be controlled to acquire surveillance video over a large surveillance site, which can most simply be modeled as a large patch of ground plane, possibly annotated with the locations of specific regions of interest (e.g., regions near the entrances to buildings, receptacles such as trash cans, or regions defined dynamically as vehicles enter and stop in the site). Each camera has a field of regard, which is the subset of the surveillance site that it can image by controlling its viewing angles (e.g., pan and tilt settings for PTZ cameras). A field of view of a camera is the image obtained at a specific resolution setting and is generally much smaller than its field of regard.

As people and vehicles move into and through the surveillance site, the cameras are to be controlled to acquire sets of videos that satisfy temporal and positional constraints that define generic surveillance tasks. Examples of typical surveillance tasks are:

Collect k seconds of unobstructed video from as close to a side angle as possible for any person who enters the surveillance site. The video must be collected at some minimal ground resolution. This task might be defined to support gait recognition, or to determine if a particular person is disabled or moving in a particular way (for instance, a suicide bomber might be moving in an awkward way).

Collect unobstructed video of any person while he is within a given region. This might be used to secure any particular sensitive point, such as a switch.

Observe a particular marked person from at least one of the views, if possible. This marking may come, for instance, from an event such as a package drop.

If any two people come close to one another, start observing both of them from at least one of the views.

Observe a person from the front for at least a few frames, either consecutively or non-consecutively. These images may be used for face recognition, for instance.

One could imagine other surveillance tasks that would be defined to support face recognition, loading and unloading of vehicles, etc. Additionally, there are tasks related to system state maintenance—for example, tasks to image a person or vehicle to obtain current position data to update a track predictor such as a Kalman filter; or tasks to intermittently monitor regions in which people and vehicles can enter the surveillance site. One would like to efficiently schedule as many of these surveillance tasks as possible, possibly subject to additional constraints on priority of the tasks.

The problem of sensor planning and scheduling has been studied extensively. In K. A. Tarabanis, P. K. Allen, and R. Y. Tsai, "A survey of sensor planning in computer vision," *IEEE Transactions on Robotics and Automation*, vol. 11, no. 1, pp. 86-104, 1995, a survey of the literature covering sensing strategies for object feature detection, model-based object recognition, localization and scene reconstruction is presented. One of the earliest works is Cregg K. Cowan and Peter D. Kovesi, "Automatic sensor placement from vision task requirement," *IEEE Transactions on Pattern Analysis and machine intelligence*, vol. 10, no. 3, pp. 407-416, 1988. This publication introduced the idea of using a locus-based approach to decide on the placement of viewpoints, subjecting to static resolution, focus, field of view and visibility constraints. Cowan et al. also described an extension of the sensing strategy to laser-scanner range sensor. I. Stamos and P. Allen, in "Interactive sensor planning," in *Computer Vision and Pattern Recognition Conference*, June 1998, pp. 489-494 discussed what they called "visibility planning". They introduced the idea of local separating planes which are used to define visibility volumes, in which occlusion-free viewpoints can be placed. Then, to satisfy the field of view constraint, they introduced the idea of the field of view cone, which is similar to the locus—based approach given in Cregg K. Cowan and Peter D. Kovesi, "Automatic sensor placement from vision task requirement," *IEEE Transactions on Pattern Analysis and machine intelligence*, vol. 10, no. 3, pp. 407-416, 1988.

The previous cited papers do not consider object motion. In Steven Abrams, Peter K. Allen, and Konstantinos A. Tarabanis, "Dynamic sensor planning.," in *ICRA* (2), 1993, pp. 605-610, Steven Abrams, Peter K. Allen, and Konstantinos Tarabanis, "Computing camera viewpoints in an active robot work cell," *International Journal of Robotics Research*, vol. 18, no. 2, February 1999, and in K. A. Tarabanis, R. Y. Tsai, and P. K. Allen, "The mvp sensor planning system for robotic vision tasks," *IEEE Transactions on Robotics and Automation*, vol. 11, no. 1, pp. 72-85, February 1995, a dynamic sensor planning system, called the MVP system, is discussed. These researchers were concerned with objects moving in the scene, thus generating what they called a swept volume in temporal space in Steven Abrams, Peter K. Allen, and Konstantinos A. Tarabanis, "Dynamic sensor planning.," in *ICRA* (2), 1993, pp. 605-610. Then, using a temporal interval search, they divide temporal intervals into halves while searching for a viewpoint that is not occluded in time by these sweep volumes. This is then integrated with other constraints such as focus and field of view in K. A. Tarabanis, R. Y. Tsai, and P. K. Allen, "The mvp sensor planning system for robotic vision tasks," *IEEE Transactions on Robotics and Automation*, vol. 11, no. 1, pp. 72-85, February 1995.

The culmination is perhaps found in Steven Abrams, Peter K. Allen, and Konstantinos Tarabanis, "Computing camera viewpoints in an active robot work cell," *International Journal of Robotics Research*, vol. 18, no. 2, February 1999, where the algorithms are applied to an active robot work cell. The publication Anurag Mittal and Larry S. Davis, "Visibility analysis and sensor planning in dynamic environments," in *European Conference on Computer Vision*, May 2004 determines optimal sensor placements offline, by considering online information that provides probabilistic priors in terms of object motion—observations made about the motion of objects in the surveillance site are probabilistically used as inputs to placing sensors offline. This ensures (probabilistically) that sensor exists in positions that will have unobstructed view of moving objects. Other studies on sensor planning include work on sensing strategies for the purpose of 3D reconstruction in the publications K. N. Kutulakos and C. R. Dyer, "Global surface reconstruction by purposive control of observer motion," in *IEEE Conference on Computer Vision and Pattern Recognition, Seattle, Wash., USA*, June 1994, K. N. Kutulakos and C. R. Dyer, "Occluding contour detection using affine invariants and purposive viewpoint control," in *IEEE Conference on Computer Vision and Pattern Recognition, Seattle, Wash., USA*, June 1994, K. N. Kutulakos and C. R. Dyer, "Recovering shape by purposive viewpoint adjustment," *International Journal of Computer Vision*, vol. 12, no. 2, pp. 113-136, 1994, and K. N. Kutulakos, "Affine surface reconstruction by purposive viewpoint control," in *International Conference on Computer Vision, Boston, Mass., USA*, June 1995, and studies on light source positioning such as S. K. Yi, R. M. Haralick, and L. G. Shapiro, "Optimal sensor and light-source positioning for machine vision," *Computer Vision and Image Understanding*, vol. 61, no. 1, pp. 122-137, 1995.

The scheduling approach that is one aspect of the present invention is based on the efficient construction of what will be called Task Visibility Intervals (TVIs). An atomic representation of a TVI is a 6-Tuple:

$$(c,(T,o),[r,d],Valid_{\psi,\phi,f}(t)), \qquad (1)$$

where:
  c represents a camera,
  (T, o) is a (task, object) pair. T is the index of a task to be accomplished and o is the index of the object to which the task is to be applied,
  [r, d] is a time interval within which (some temporal segment of) the task can be accomplished using camera c. r is the earliest release time of the task while d is the deadline by which the task has to be completed,
  t denotes the time instances such that t∈[r, d], and
  $Valid_{\psi,\phi,f}(t)$ is the set of different combinations of azimuth angles ($\psi$), elevation angles ($\phi$)) and focal lengths (f) that camera c can use to capture object o at time t.

The attention in the present invention is focused on tasks that are satisfied by video segments in which an object is seen unobstructed for some task-specific minimal period of time, and is viewed at some task-specific minimal resolution during that time period. The tasks themselves are 3-tuples:

$$(p,\alpha,\beta) \qquad (2)$$

where
  p is the required duration of the task, including latencies involved in re-positioning cameras,
  $\alpha$ is a predicate relating the direction of the object's motion and the optical axis of the camera used to accomplish the task (for example to specify a view that satisfies the requirements for a side view or a front view), and
  $\beta$ is the minimal resolution, represented with respect to the ground plane, needed to accomplish the task.

In general, not all tasks would be applicable to all objects—one can imagine tasks for viewing faces of people, license plates of vehicles, etc. For simplicity in the subsequent exposition, it is assumed that all tasks are to be accomplished for all objects being tracked through the surveillance site. Given a (task, object) pair, the motion model of the object acquired through visual tracking along with a simple object shape model that combines size and positional uncertainty is used to compute, for each camera, c, in the camera suite, temporal intervals of visibility along with the ranges of sensor settings that can be employed to accomplish the task while keeping the object within the camera's field of view.

While camera scheduling could be conducted solely on the basis of the atomic TVIs, more (task, object) pairs can be scheduled if subsets of such pairs that can be simultaneously satisfied within the same time interval could efficiently be identified. Such time intervals will be called Multiple Tasks Visibility Intervals (MTVIs), and it will be shown how a plane-sweep algorithm can be used to determine these MTVIs. Each camera can then be scheduled to execute a sequence of (M)TVIs, with the objective of maximizing task coverage. Due to the difficulties faced by problems related to scheduling, several approximation algorithms will be provided according to one aspect of the present invention that can be shown to yield solutions that are within a certain factor of the optimal one. Furthermore, due to the uncertainties associated with future object motion, one would also need some mechanism to verify, a posteriori, that the tasks have been successfully completed (i.e., that in fact one has obtained unobstructed video of some given object) so that it can be determined if the task has to be rescheduled (which, of course, will not always be possible). The tracking module used for providing real-time information about the objects in the scene can be used for such verification purpose.

Constructing TVIs

The construction of atomic TVIs can be divided into two main steps:
1. For each camera, determine temporal intervals during which an object remains unobstructed and within the camera's field of regard. These temporal intervals will be called visibility intervals.
2. Determine sub-intervals within these visibility intervals such that camera settings (in terms of viewing angles and focal length) exist that satisfy task-specific resolution requirement and maintain the object within a field of view. These sub-intervals are the atomic TVIs.

Object Visibility

In this section, visibility intervals from the object motion models in the surveillance site will be determined. For any given (object, camera) pair one first computes time intervals during which that object is in the same line of sight as some other object, but is further from the camera, causing it to be occluded. The temporal intervals of such occlusions depend on the physical extents and motion models of the object.

To determine these occlusion intervals, a suitable representation of object shape and size is needed. For this purpose ellipsoids are used. The size of the ellipsoid combines the estimate of physical object size along with the time varying positional uncertainty in the location of the object, as estimated by the tracker. The computational advantage of the ellipsoidal representation is the ease with which the contour of the image of the object can be computed using the polar plane as described in R. I. Hartley and A. Zisserman, *Multiple View Geometry in Computer Vision*, Cambridge University Press, ISBN: 0521623049, 2000. A polar plane π is formed between the camera center $c_p$, and the quadric coefficient matrix Q of the ellipsoid representing the object:

$$X^T Q X = 0$$

$$\pi = Q c_p. \tag{3}$$

Q is a symmetric 4×4 matrix and X is a point on Q. The polar plane is defined by the set of points of contact with Q of the cone of rays through $c_p$ tangent to Q. One can see in FIG. 1 that π intersects Q in a conic C. From the equation representing C one can compute the minimum and maximum azimuth and elevation angles subtended by the conic.

Figure 2:
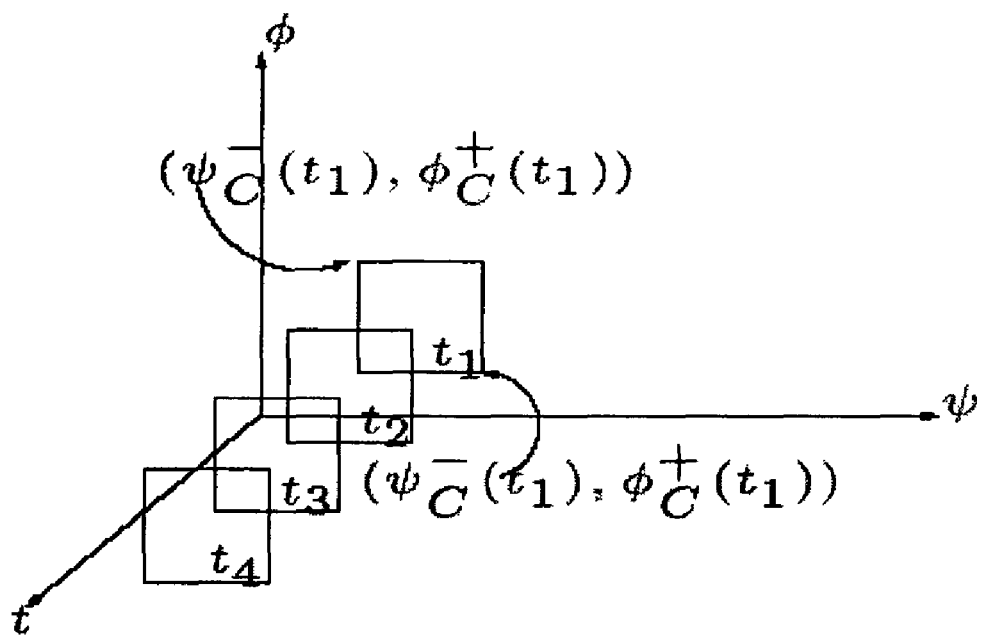
FIG. 2 is a diagram of a motion model.

These azimuth and elevation angles will be explicitly computed as a function of time by sampling. Let $(\psi_C^-(t), \psi_C^+(t), \phi_C^-(t), \phi_C^+(t))$, where ψ and φ represent azimuth and elevation angle respectively, denote the range of azimuth and elevation angles subtended by the conic in camera c at time t. One can visualize such a vector as a rectangle at each time step in ψ–φ space as shown in FIG. 2. Thus, as an object moves through the scene in time, one can represent its motion model M as a sequence of 6-vectors:

$$M = (c, o, \psi_C^-(t), \psi_C^+(t), \phi_C^-(t), \phi_C^+(t)), \tag{4}$$

where c and o specify the camera and object respectively.

Figure 3:
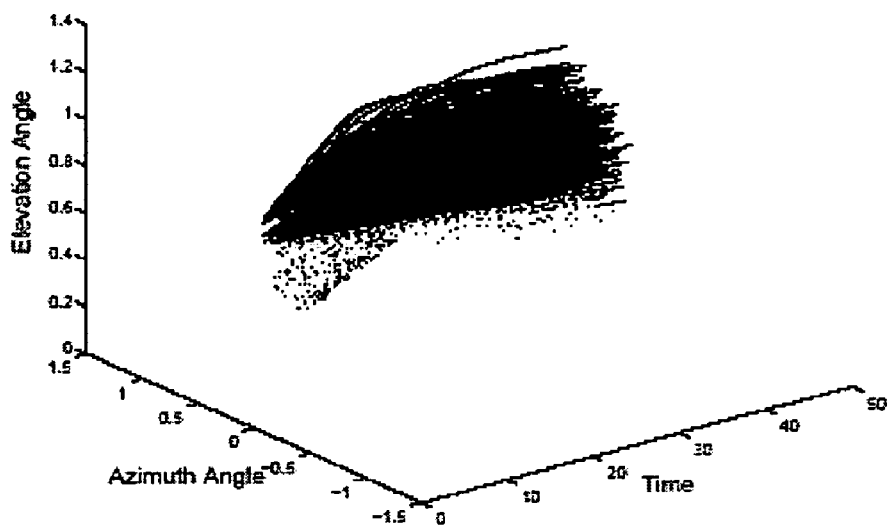
FIG. 3 is a diagram showing intersection of motion models.

Consider the motion models $M_1$ and $M_2$ [Eqn. 4] of two different objects with respect to camera c. The intersection of $M_1$ and $M_2$ is a spatio-temporal volume. The volume is delimited in time by a temporal interval, which is exactly the occlusion interval. The object, then, is visible in the set complement of each occlusion interval; this immediately provides the visibility intervals. An example of determining an occlusion interval by intersecting the time-varying angular extents of two objects is shown in FIG. 3.

In order to efficiently compute the occlusion intervals, one may proceed as follows: First, for each time t sort the azimuth angles by minimum azimuth angle. A simple sweeping algorithm can then identify all pairs of azimuth intervals that overlap. Construct an n×n matrix, $O_t$, where n is the number of objects being tracked, and mark entry (i, j) as −1 if the azimuth interval for object i overlaps the azimuth interval for object j at time t and if i is closer to the camera at time t than j. Otherwise, mark entry (j, i). Next sort the elevation angles for all objects, again according to minimal elevation angle, and employ a sweep algorithm to find all overlapping intervals. If the elevations angle intervals for objects i and j overlap, multiply the (i, j)th entry of $O_t$ by −1 if i is closer than j, otherwise multiply the (j, i)th entry by −1; when this is completed, the (i, j)th entry of $O_t$ is 1 iff object i occludes object j at time t.

Finally, the matrix $O_t$ is projected on the j axis using an OR projection. Let $OC_t$ be the result of this projection operation. $OC_t(j) = 1$ iff object j is occluded by some other object at time t. This is done for all times t; then simply stack the $OC_t$ vectors one atop the other, and scan the columns for visibility intervals.

Sensor Settings

As mentioned, visibility intervals determined with the approach described in the previous section can be further pruned based on feasible camera settings, resulting in a set of atomic TVIs for a given camera. Each camera used in the system here provided as an aspect of the present invention possesses the following two properties: (1) it rotates about an axis passing approximately through the corresponding camera center, and (2) it is zoomable so that the focal length can be suitably adjusted. As a result, the projection matrix P of a camera c can be written as:

$$P(R) = K[R|T], \tag{5}$$

where
- R is the rotation matrix in the world coordinate system. P is parameterized by R as c repositions itself by rotating in the midst of executing some schedule,
- T is the translation matrix in the world coordinate system, given by the fixed-mount position of the camera, and $$K = \begin{bmatrix} f_c m_x & s & x_0 \\ 0 & f_c m_y & y_0 \\ 0 & 0 & 1 \end{bmatrix}$$

is the camera intrinsic matrix. Here, $f_c$ is the focal length, $(m_x, m_y)$ are the image scalings in the x and y directions, s is the skew factor and $(x_0, y_0)$ is the principle point.

Again consider the ellipsoidal representation of an object by a quadric coefficient matrix Q(t), parameterized by time t as the object moves in the surveillance site. The image of the object ellipsoid is a conic $C(t)=[C_1, C_2, C_3]$ such that:

$$C^*(t) = P(R)^* Q^*(t)^* P^T(R), \quad (6)$$

where
- $C^*(t)=C^{-1}(t)$ is the dual of C(t) assuming full rank, and
- $Q^*(t)$ is the adjoint of Q(t).

Given that Q(t) represents an ellipsoid, $C_1$, $C_2$ and $C_3$ can be respectively written as $[0, 0, a^2]^T$, $[0, b^2, 0]^T$ and $[0, 0, a^2 * b^2]^T$, where a and b are the image width and height of C(t).

Using min(a, b) then allows to determine whether the resolution requirement of a task is satisfied. Additionally, the following procedure can be employed to determine ranges of feasible camera settings for each camera c and (task, object) pair (T, o):

1. Iterate t from the start to the end of the visibility intervals previously determined using the approach described in the previous section.
2. Iterate $(\psi_c, \phi_c)$ respectively from the minimum to maximum azimuth $(\psi_C^-, \psi_C^+)$ and elevation angles $(\phi_C^-, \phi_C^+)$ (the minimum and maximum viewing angles would depend on the field of regard of the camera).
3. Determine P(R) [Eqn. 5], where R is given by $\psi_c$ and $\phi_c$.
4. Let $f_C = f_C^-$ where $f_C^-$ is the focal length that satisfies the minimum resolution $\beta_{min}$ required by the task. $f_C^-$ can be determined by adjusting $f_C$ in K so that min(a, b)=$\beta_{min}$.
5. If the image conic [Eqn. 6] lies outside the image boundaries (i.e., outside the field of view), go to step 7.
6. Increment $f_C$ and repeat step 5.
7. If $f_C \neq f_C^-$, let $f_C^+ = f_C$ since $f_C$ now gives the maximum possible resolution while keeping the object in the field of view.
8. Update the TVI (c, (T, o), [r, d], $\text{Valid}_{\psi, \phi, f}(t)$) [Eqn. 1], using the valid ranges of sensor settings that have been determined.

Figure 4:
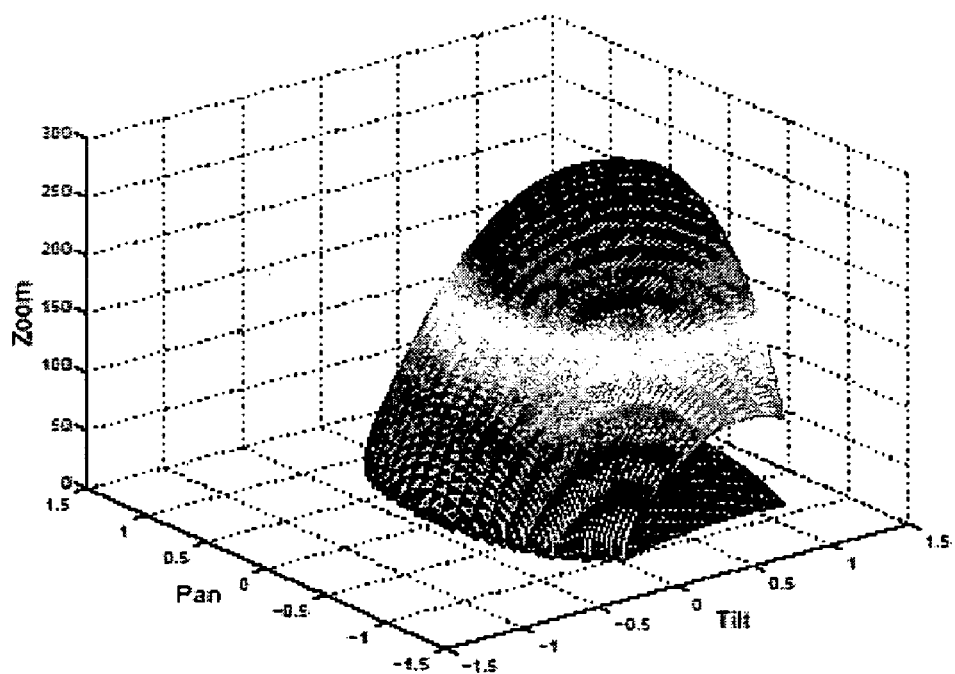
FIG. 4 is another diagram of intersecting motion models.
Figure 5:
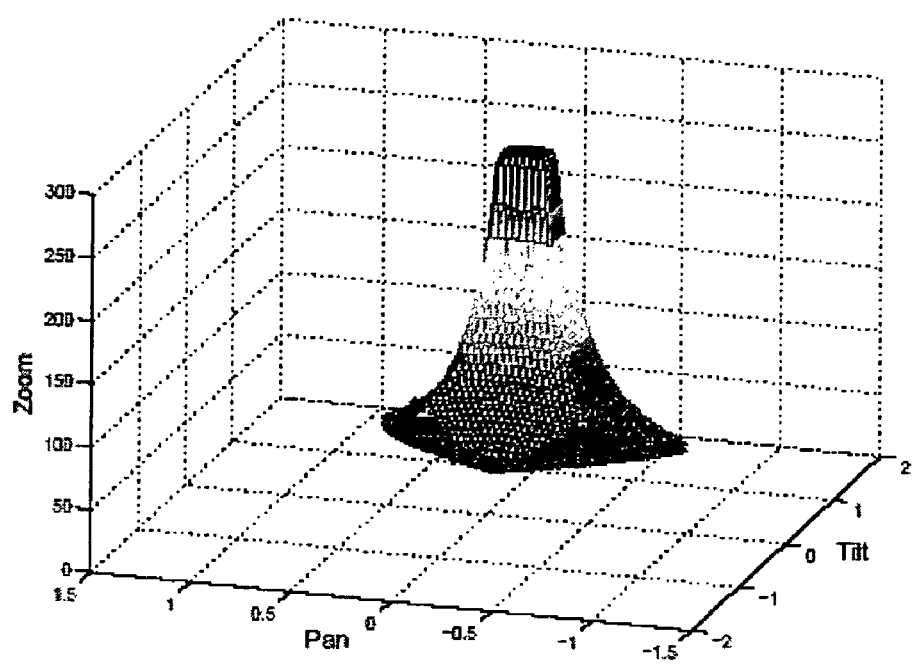
FIG. 5 is another diagram of intersecting motion models.

A practical consideration when utilizing this procedure is to use reasonably large discrete steps in t, $\psi_C$ and $\phi_C$. A robust regression algorithm can then be used to construct each pair of lines representing $(\psi_C^-, \psi_C^+)$ on the azimuth-time plane, $(\phi_C^-, \phi_C^+)$ on the elevation-time plane and $(f_C^-, f_C^+)$ in the focal-time plane. These projections serve as a simple representation of an otherwise complex 4D volume in azimuth angle, elevation angle, focal length and time. Illustrations are shown in FIGS. 4-9. In FIG. 4 and FIG. 5, 3D surfaces in $\psi_C$, $\phi_C$, and $f_C$ at t=0 are shown. Both surfaces for $f_C^-$ and $f_C^+$ are shown in each plot. FIG. 4 is without field of view constraint while FIG. 5 includes that constraint—the plot of FIG. 4 thus covers wider viewing angles, which become invalid only when the object is behind the image plane. The peaks in both the plots of FIG. 4 and FIG. 5 coincide with the object's orientation, in which case C(t) is just a circle and has the lowest resolution.

Figure 6:
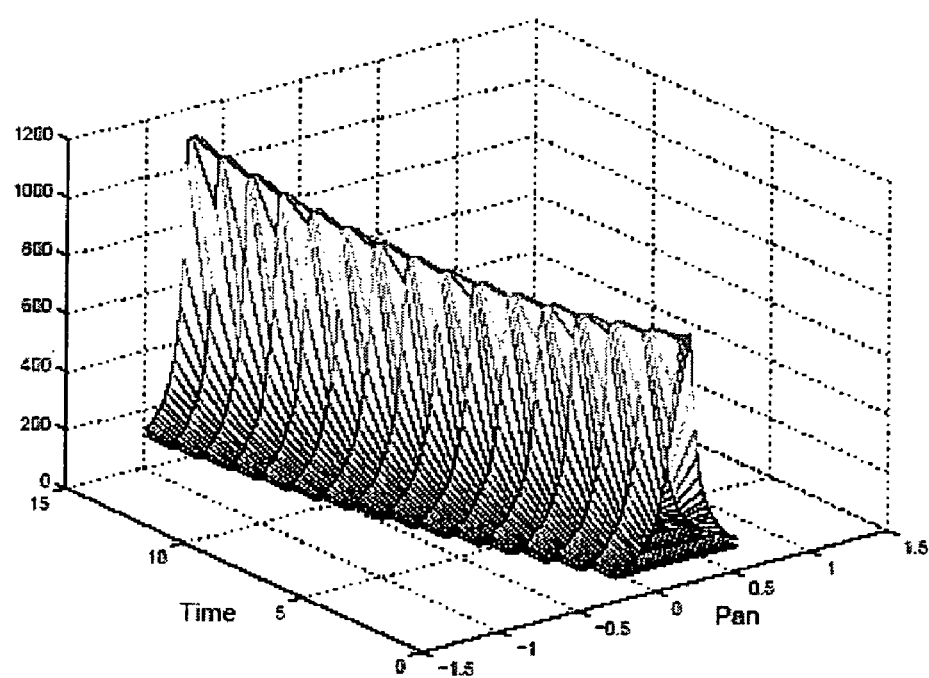
FIG. 6 is a diagram of temporal behavior of objects.
Figure 7:
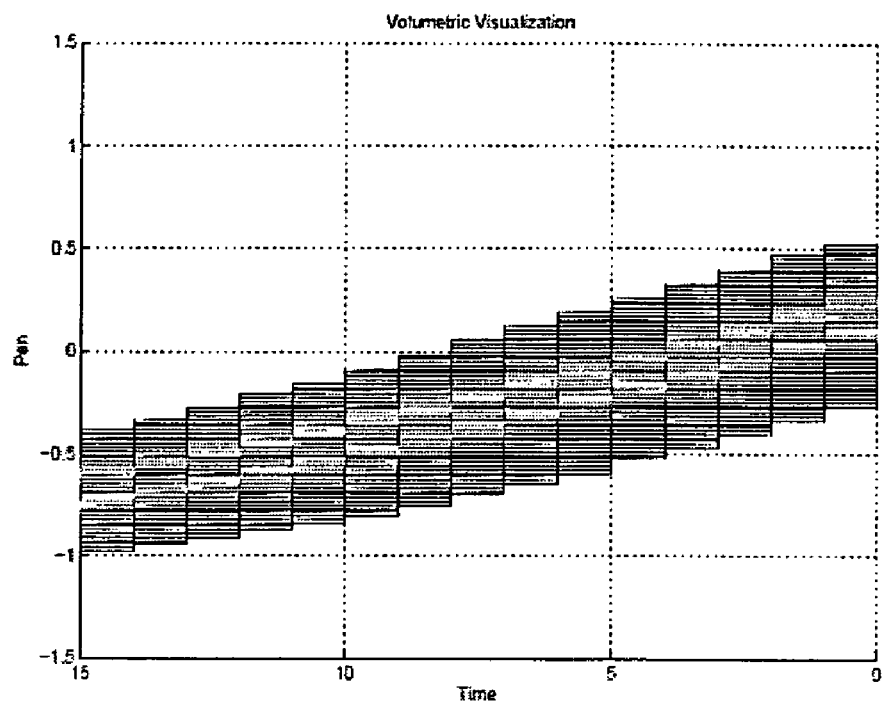
FIG. 7 is another diagram of temporal behavior of objects.
Figure 8:
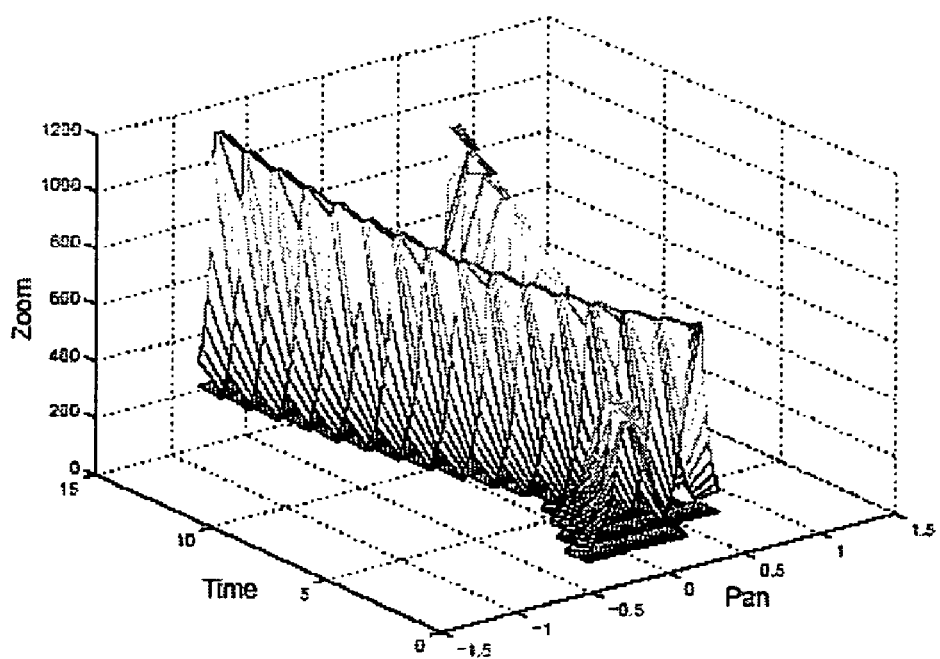
FIG. 8 is a diagram showing temporal behavior of intersecting objects.
Figure 9:
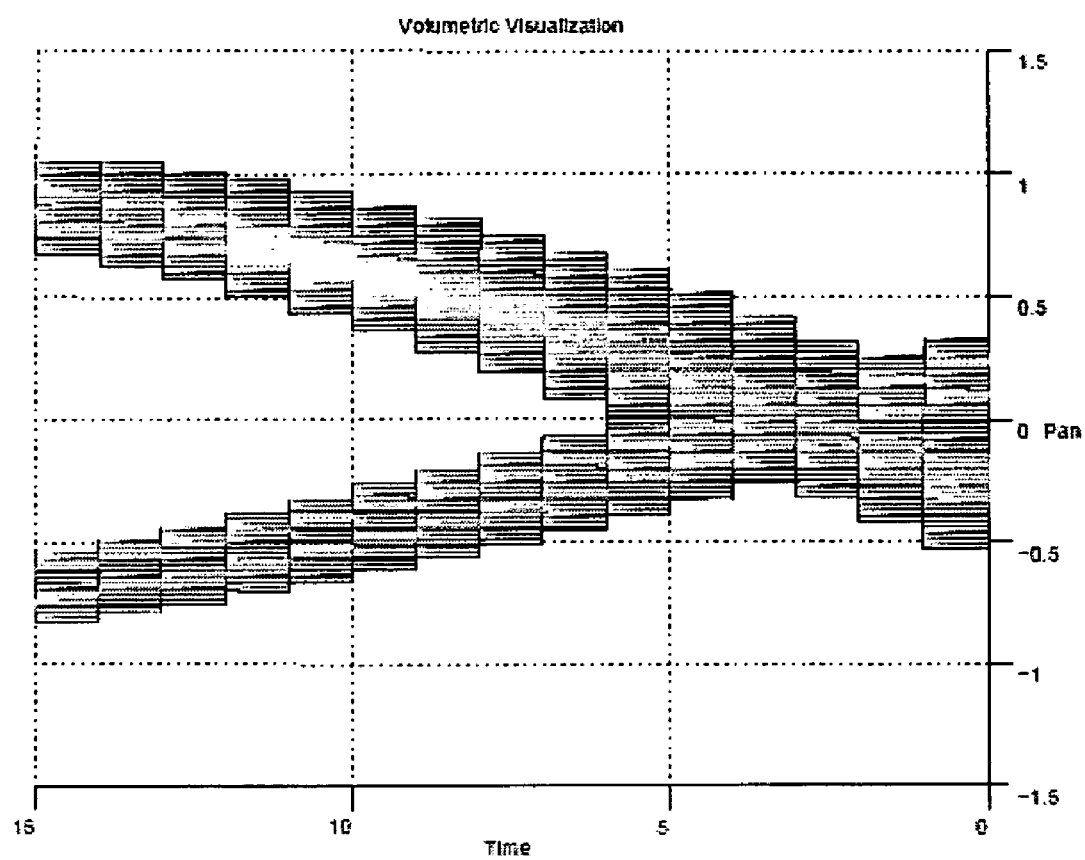
FIG. 9 is another diagram showing temporal behavior of intersecting objects.

Describing FIGS. 1-9 in more detail: FIG. 1. The contour of an object is the intersection of the polar plane of c (with respect to Q representing the object) with Q. Such an intersection is a conic C. FIG. 2. At each time step, the angular extents of the object can be visualized as a rectangle. The motion model M can be viewed as the footprints of these angular extents through time. FIG. 3. Intersecting motion models to get occlusion intervals. Tracked points on the contours of two real objects moving in the scene are used in a particle filter framework to construct their angular extents in time. These made up two volumes as shown—where they intersect is the time interval during which one is occluding the other. FIG. 4. Without field of view test. FIG. 5. With field of view test. FIG. 6. Temporal behavior of the relations between the object motion and sensor settings. The tilt value is kept at zero in this plot. FIG. 7. The two extremes of plot of FIG. 6 in the $\psi$-t plane. FIG. 8. Two objects shown here can be captured with the same sensor settings where they intersect. FIG. 9. A 2D view of FIG. 8. The start and end of the temporal interval can be obtained as the time instances where they intersect.

Compositing TVIs

The TVIs constructed in the previous section for a given camera satisfy object visibility, task-specific resolution and field of view constraint for a single task. For a given camera, the corresponding TVIs can possibly be combined so that multiple tasks can now be satisfied simultaneously in a single scheduled capture. The resulting intervals are called Multiple Tasks Visibility Intervals (MTVIs). Formally, a set of n TVIs, each represented in the form:

$(c, (T_i, o_i), [r_i, d_i], \text{Valid}_{\psi_i, \phi_i, f_i}(t))$, for TVI i [Eqn. 1], can be combined into a valid MTVI represented as:

$$\left( c, \bigcup_{i=1 \ldots n} (T_i, o_i), \bigcap_{i=1 \ldots n} [r_i, d_i], \bigcap_{i=1 \ldots n} \text{Valid}_{\psi_i, \phi_i, f_i}(t) \right), \quad (7)$$

subject to the conditions that:

$$\bigcap_{i=1 \ldots n} [r_i, d_i] \neq 0,$$

$$\bigcap_{i=1 \ldots n} [r_i, d_i] \geq p_{max},$$

where $p_{max}$ is the largest processing time among the tasks [Eqn. 2] and for $$t \in \bigcap_{i=1 \ldots n} [r_i, d_i], \quad (8)$$

$$\bigcap_{i=1 \ldots n} \text{Valid}_{\psi_i, \phi_i, f_i}(t) \neq 0.$$

The combination of TVIs into MTVIs is illustrated in FIG. 6. The temporal behavior of an object for a task is shown by keeping the elevation angle as zero. The corresponding 2D view is shown in FIG. 7 in the azimuth-time plane. In FIG. 8 and FIG. 9, the plot for the same object is intersected with that of another task. The resulting volumetric intersection is delimited by a temporal interval, and a region of common camera settings exists that can be used to satisfy both tasks simultaneously. Again, a simple representation of such volumes is utilized to find these common camera settings by projecting them onto the respective 2D planes (i.e., azimuth-time, elevation-time and focal length-time), when the intersections can be computed efficiently.

Plane-Sweep Algorithm

The construction of all feasible [Eqn. 8] MTVIs for a given camera is a computationally expensive operation, because one would then have to determine all feasible MTVIs that satisfy numbers of tasks-ranging from 2 to the total number of tasks at hand. In this section, an efficient plane-sweep algorithm will be provided as one aspect of the current invention.

The term "slack" $\delta$ of a (M)TVI will be defined as:

$$\delta=[t_\delta^-, t_\delta^+]=[r, d-p], \quad (9)$$

where again r, d and p are as given in Eqn. 1 and 2. Intuitively, the slack is just a temporal interval within which a task can be started. The lapse $|\delta|$ is defined as $t_\delta^+ - t_\delta^-$.

One can now construct what will be called an Ordered Timeline (OT) along which the sweeping is performed, using the following procedure:
1. Compute the set $S_2$ of all feasible MTVIs containing two tasks (which can be done simply using an $O(n^2)$ approach).
2. If $p_1$ and $p_2$ are the respective processing time of the two tasks in a MTVI, indexed by i, constructed in the previous step, then let its slack $\delta_i$ be $[t_{\delta_i}^-, t_{\delta_i}^+]=[r, d-\max(p_1, p_2)]$, here r and d are the earliest release time and deadline of the MTVI.
3. Construct a timeline as $\cup_i \{t_{\delta_i}^-, t_{\delta_i}^+\}$.
4. Sort the timeline in the previous step to get the OT.

Figure 10:
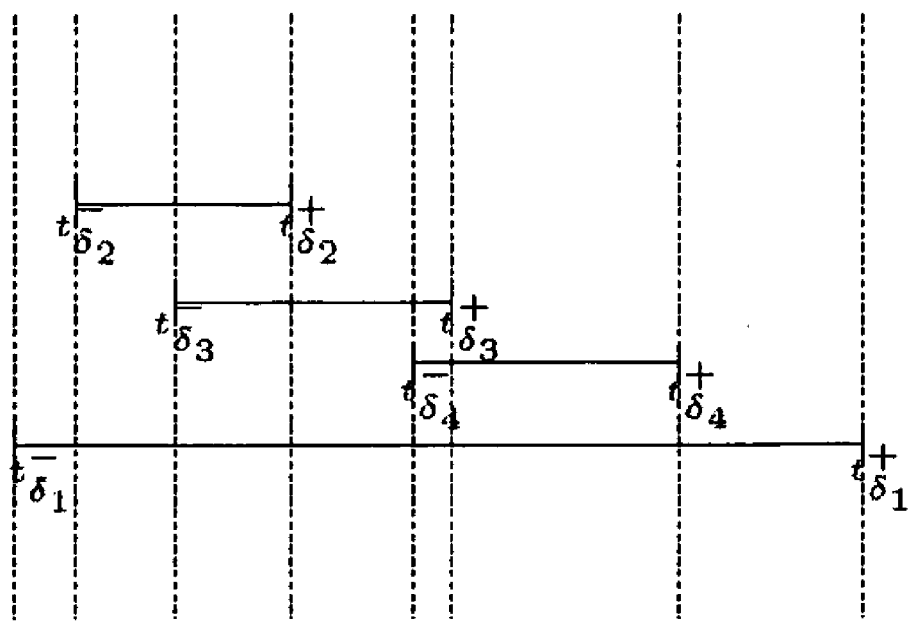
FIG. 10 is a diagram of an Ordered Timeline.

An example is shown in FIG. 10, in which four different pairwise MTVIs are used to construct an OT. Due to the "splitting" effect of the procedure, the utilization of slacks, instead of [r, d] in Eqn. 1, when forming the OT ensures that any resulting MTVI after applying the plane-sweep algorithm does not have negative lapse in its slack—i.e., there is no valid time to start tasks in the MTVI.

FIG. 10 illustrates forming an OT from different pairwise MTVIs. There are four MTVIs given in this example with slacks: $[t_{\delta_1}^-, t_{\delta_1}^+]$, $[t_{\delta_2}^-, t_{\delta_2}^+]$, $[t_{\delta_3}^-, t_{\delta_3}^+]$ and $[t_{\delta_4}^-, t_{\delta_4}^+]$. The resulting OT consists of the slacks: $[t_{\delta_1}^-, t_{\delta_2}^-]$, $[t_{\delta_2}^-, t_{\delta_3}^-]$, $[t_{\delta_3}^-, t_{\delta_2}^+]$, $[t_{\delta_2}^+, t_{\delta_4}^-]$, $[t_{\delta_4}^-, t_{\delta_3}^+]$, $[t_{\delta_3}^+, t_{\delta_4}^+]$ and $[t_{\delta_4}^+, t_{\delta_1}^+]$.

It is also apparent from FIG. 10 that the new set of slacks along the OT is made up of the following types:
SS intervals formed from the start times of two consecutive slacks.
SE intervals formed from the start and end times of two consecutive slacks.
ES intervals formed from the end and start times of two consecutive slacks.
EE intervals formed from the end times of two consecutive slacks.

In addition, at any time step along the OT, it is possible that one or more previously encountered MTVIs remain "active". So, for example in FIG. 10, the MTVI with slack $[t_{\delta_1}^-, t_{\delta_1}^+]$ remains active till the end of the OT. In the following plane-sweep algorithm, a set $S_{active}$ of such active MTVIs will be maintained. For ease of illustration, the two MTVIs that made up each interval along the OT will be referred to as $m_{first}$ and $M_{second}$ respectively in order of their appearance. The plane-sweep algorithm can then proceed by advancing across the OT in the following manner:
1. If an SS slack is encountered, initialize a new MTVI $m_{new}$ with tasks in $m_{first}$ and slack equals to the SS slack. MTVIs in $S_{active}$ that satisfy Eqn. 8 with $m_{new}$ are appropriately combined; otherwise they are added as separate MTVIs, again with slack equal to the SS slack.
2. If an SE slack is encountered, (1) add tasks from both $m_{first}$ and $m_{second}$ and assign to it the SE slack, if they meet the conditions in Eqn. 8, or (2) keep $m_{first}$ and $m_{second}$ as two MTVIs $m_{new,1}$ and $m_{new,2}$, but assigning to both the SE slack. Process $S_{active}$ in the same manner as step 1, but on either $m_{new}$ (case 1) or both $m_{new,1}$ and $m_{new,2}$ (case 2).
3. If an ES slack is encountered, add MTVIs in $S_{active}$, assigning to them the ES slack.
4. If an EE slack is encountered, initialize $m_{new}$ with tasks in $m_{second}$ and slack equals to the EE slack. Process $S_{active}$ in the same manner as step 1 on $m_{new}$.

After performing the plane-sweep algorithm for a given camera, each interval along the corresponding OT now consists of a set cover (not necessarily a minimum set cover) of tasks that could be satisfied in that interval. These set covers (comprised of the resulting MTVIs from the plane. sweep algorithm) are eventually used in the final scheduling algorithm, which will be detailed in the following section.

One would also like to verify the correctness of the plane-sweep algorithm: that the OT sufficiently delineate all feasible MTVIs' slacks (i.e., that any (M)TVI's slack is delimited by a pair of time instances on the OT). This can be easily understood in the following theorem:

Theorem 1. Let the slacks start and end times of any MTVI be $t_\delta^-$ and $t_\delta^+$.
Then $t_\delta^-, t_\delta^+ \in OT$.
Proof. Let the number of tasks in the MTVI be $n (\geq 2)$. One can form up to $$\binom{n}{2}$$

feasible pairwise MTVIs. The corresponding slacks $[t_{\delta_i}^-, t_{\delta_i}^+]$ $\in OT$ for $$i = 1 \ldots \binom{n}{2}$$

Then, $t_\delta^- = \max(t_{\delta_i}^-)$ and $t_\delta^{+x=\min(t_{\delta_i}^+)}$. □

Sensor Scheduling

Given the set of atomic TVIs and MTVIs that have been constructed, the scheduling problem faced by the system is then to decide: (1) which (M)TVIs should be executed, and (2) when should the chosen (M)TVIs be executed—i.e., given a set of (M)TVIs chosen for execution, what should the order of execution be. The primary objective of these decisions is to maximize the coverage of tasks. In general, scheduling problems such as this are NP-hard, making the search for an optimal solution computationally infeasible.

As an overview, the algorithm that is provided as one aspect of the present invention in this section first deals with constructing single-camera schedules, by running DP (Dynamic Programming) on a Directed Acyclic Graph (DAG). The problem is made computationally feasible by introducing a precedence ordering on the set of (M)TVIs that can be scheduled by a given camera. It is assumed that any resulting schedule is non-preemptive—i.e., once a task is started, it cannot be interrupted.

Single-camera Scheduling

For a given camera, a schedule is simply a subset of the set of atomic TVIs and MTVIs constructed, ordered by the sequence of execution. The number of (M)TVIs in a single-camera schedule is limited by the length of prediction time. So for example, in the present system, the object positions (based on the estimated motion models) are predicted for 1 (typically between 5 and 8) seconds ahead, thereby limiting deadlines of feasible (M)TVIs to current time step plus 1 seconds.

In order to find the optimal schedule for a single camera, the following theorems are introduced that make the single-camera scheduling problem tractable:

Theorem 2. Consider a camera. Let $\delta_{max} = \text{argmax}_{\delta_i}(|\delta_i|)$ and $p_{min}$ be the smallest processing time among all (M)TVIs. Then, if $|\delta_{max}| < p_{min}$, any feasible schedule for the camera is ordered by the slacks' start times.

Proof. Consider that the slack $\delta_1 = [t_{\delta_1}^-, t_{\delta_1}^+]$ precedes $\delta_2 = [t_{\delta_2}^-, t_{\delta_2}^+]$ in a schedule and $t_{\delta_1}^- > t_{\delta_2}^-$. Let the processing time corresponding to $\delta_1$ be $p_1$. Then $t_{\delta_1}^- + p_1 > t_{\delta_2}^- + p_1$. It is known that if $t_{\delta_1}^- + p_1 > t_{\delta_2}^+$ then the schedule is infeasible. This happens if $t_{\delta_2}^+ \leq t_{\delta_2}^- + p_1$—i.e., $t_{\delta_2}^+ - t_{\delta_2}^- \leq p_1$. Given that $|\delta_{max}| < p_{min}$, $t_{\delta_2}^+ - t_{\delta_2}^- \leq p_1$ is true.

Theorem 2 implies that if $|\delta_{max}| < p_{min}$ one can just look for feasible schedules that are ordered by the slacks' start times. In practice, such a condition is hardly restrictive at all, since it is easy to adjust the processing time of tasks to meet the condition. Based on this assumption, consider the setup of a DAG:

Each (M)TVI is a node.

Define a source node with outgoing edges to all (M)TVI nodes. The weights of these edges are the number of tasks covered in the (M)TVI nodes.

Define a sink node with incoming edges from all (M)TVI nodes. Let their weights be 0.

An outgoing edge from a (M)TVI node to another exists iff the slack's start time of the first node is earlier than that of the second.

Edges between (M)TVI nodes set up as above can however be removed if it makes the schedule infeasible. Consider the following theorem and corollary:

Theorem 3. A feasible schedule contains a sequence of n (M)TVIs each with slack $\delta_i = [t_{\delta_i}^-, t_{\delta_i}^+]$, where $i = 1 \ldots n$ represents the order of execution, such that $$t_{\delta_n}^+ - t_{\delta_1}^- \geq \left(\sum_{i=1 \ldots n-1} p_i\right) - \left(\sum_{i=1 \ldots n-1} |\delta_i|\right),$$

$p_i$ being the processing time of the $i^{th}$ (M)TVI in the schedule.

Proof. For the schedule to be feasible the following must be true: $t_{\delta_1}^- + p_1 \leq t_{\delta_2}^+, t_{\delta_2}^- + p_2 \leq t_{\delta_3}^+, \ldots, t_{\delta_{n-1}}^- + p_{n-1} \leq t_{\delta_n}^+$. Summing them up gives $$t_{\delta_1}^- + t_{\delta_1}^- + \ldots + t_{\delta_{n-1}}^- + \sum_{i=1 \ldots n-1} p_i \leq t_{\delta_2}^+ + t_{\delta_3}^+ + \ldots + t_{\delta_n}^+$$

which can then be simplified as $$t_{\delta_n}^+ - t_{\delta_1}^- \geq \left(\sum_{i=1 \ldots n-1} p_i\right) - \left(\sum_{i=1 \ldots n-1} |\delta_i|\right).$$

It is also clear that the condition $t_{\delta_1}^- + p_1 \leq t_{\delta_2}^+, t_{\delta_2}^- + p_2 \leq t_{\delta_3}^+, \ldots, t_{\delta_{n-1}}^- + p_{n-1} \leq t_{\delta_n}^+$ is sufficient for checking the feasibility of a schedule.

Corollary 1. Define a new operator, such that $\delta_1(=[t_{\delta_1}^-, t_{\delta_1}^+]) \lessdot \delta_2(=[t_{\delta_2}^-, t_{\delta_2}^+])$, then $t_{\delta_1}^- + p_1 \leq t_{\delta_2}^+$. Consider a schedule of (M)TVIs with slacks $\delta_{1 \ldots n}$. The condition: $\delta_1 \lessdot \delta_2, \delta_2 \lessdot \delta_3, \ldots, \delta_{n-1} \lessdot \delta_n$, is necessary for the schedule to be feasible. Conversely, if a schedule is feasible, then $\delta_1 \lessdot \delta_2, \delta_2 \lessdot \delta_3, \ldots, \delta_{n-1} \lessdot \delta_n$. The proof follows easily from Theorem 3.

As a result, due to Corollary 1, an edge between two (M)TVI nodes can then be removed if they violate the relationship since they can never be part of a feasible schedule.

Figure 11:
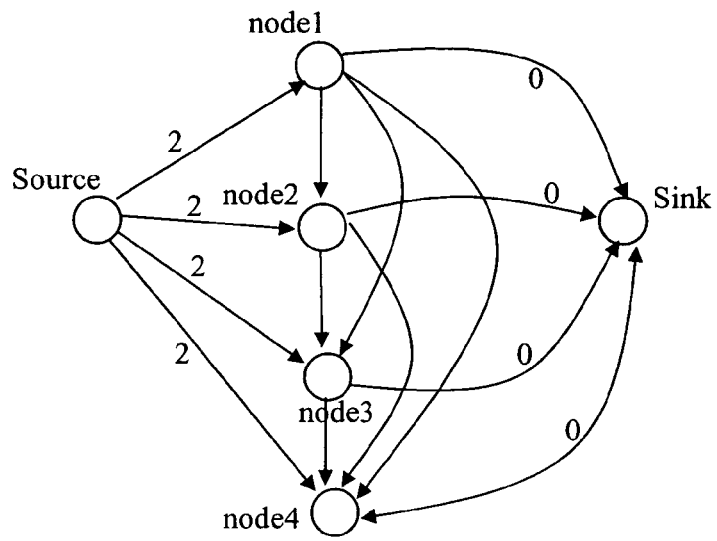
FIG. 11 is a scheduling graph.
Figure 12:
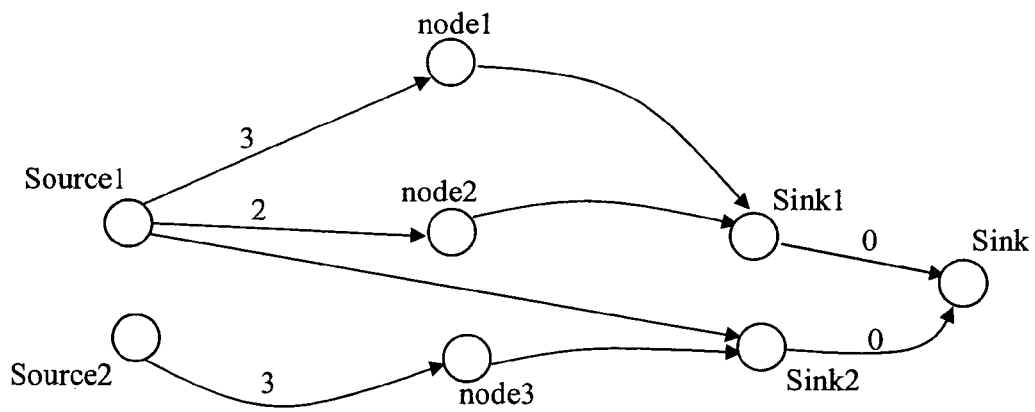
FIG. 12 is another scheduling graph.

For illustrative purposes FIG. 11 shows a single-camera scheduling graph: DAG formed from the set $\{\text{node}_1 = \{T_1, T_2\}, \text{node}_2 = \{T_2, T_3\}, \text{node}_3 = \{T_3, T_4\}, \text{node}_4 = \{T_5, T_6\}\}$. The weights between (M)TVI nodes are determined on the fly during DP. Assume that, in this example, the relationship is satisfied for the edges between the (M)TVI nodes. FIG. 12 shows a multi-camera scheduling: DAG formed from the set $\{\text{node}_1 = \{T_1, T_2, T_3\}, \text{node}_2 = \{T_3, T_4\}\}$ for the first camera, and the set $\{\text{node}_3 = \{T_1, T_2, T_3\}\}$ for the second camera.

The weights of the edges between (M)TVI nodes in the DAG are determined on the fly during the backtracking stage of a DP algorithm, illustrated by the following example with the aid of FIG. 11 and FIG. 13. Consider the following set of (M)TVIs that have been constructed for a given camera, represented by the tasks ($T_{i \ldots 6}$) they can satisfy and sorted in order of their slacks' start times: $\{\text{node}_1 = \{T_1, T_2\}, \text{node}_2 = \{T_2, T_3\}, \text{node}_3 = \{T_3, T_4\}, \text{node}_4 = \{T_5, T_6\}\}$, where the set of nodes in the DAG in FIG. 11 is given as $\text{node}_{i=1 \ldots 4}$. Consequently, one can form a table for running DP as shown in FIG. 13. One may begin by looking at paths of length 1 to the sink. In this case, paths of length 1 exist starting from $\text{node}_{1 \ldots 4}$ to the sink, all with weights 0. Next, paths of length 2 exist from the source and $\text{node}_{1 \ldots 3}$ to the sink, with the next node in such a path being the starting node of one of the valid paths of length 1 to the sink (i.e., in this example $\text{node}_{1 \ldots 4}$). The "merits" of these paths (ending at the sink) are respectively computed as follow, which illustrates the making of decisions for choosing paths of length 2 to the sink:

1. From the source, paths of length 2 exist by moving on to either one of $\text{node}_{1 \ldots 4}$. Since the number of tasks that would be satisfied on moving from the source to $\text{node}_1$, are all 2, one can default to the first path, which is from the source to $\text{node}_1$. Such a path satisfies $\{T_1, T_2\}$, and therefore has a merit of 2.

2. From $\text{node}_1$, paths of length 2 exist by moving on to either one of $\text{node}_2 \ldots, 4$. So, if one moves from $\text{node}_1$ to $\text{node}_2$, $\{T_1, T_2, T_3\}$ are satisfied, giving the path a merit of 3. Similarly, moves from $\text{node}_1$ to $\text{node}_{3 \ldots 4}$ produce paths satisfying $\{T_1, T_2, T_3, T_4\}$ and $\{T_1, T_2, T_5, T_6\}$ respectively, thus giving merits of 4 to both paths. The default path is chosen to break the tie—i.e., path of length 2 from $\text{node}_1$ to $\text{node}_3$.

3. Using the same procedure, paths of length 2 from $\text{node}_2$ exist to $\text{node}_{3 \ldots 4}$. The path with the larger merit is $\text{node}_2$ to $\text{node}_4$, satisfying $\{T_2, T_3, T_5, T_6\}$.

4. Finally, from $\text{node}_3$, the only path of length 2 is going from it to $\text{node}_4$, satisfying $\{T_3, T_4, T_5, T_6\}$.

The above procedure is then repeated, each time incrementing the desired path length, and terminated when there is only one path left that starts at the source node or a path starting at the source node covers all the tasks. So in the illustrative example, the optimal path becomes $\text{node}_1 \rightarrow \text{node}_3 \rightarrow \text{node}_4$, terminated at paths of length 4 from the sink when all the tasks are covered. It can also be observed from the example, that the layout of the DP table is always "triangular" due to the assumption in Theorem 2.

Multi-camera Scheduling

Under the condition given in Theorem 2, the use of DP for constructing single-camera schedule is optimal and has polynomial running time. Unfortunately, when multiple cameras are considered, the scheduling problem inherently becomes NP-complete. To deal with it, one can again consider the precedence ordering introduced as a result of Theorem 2, by adding multiple source-sink pairs (one pair per camera) and linking the node of one camera's sink node to another camera's source node in the DAG (an example can be found in FIG. 12).

Using such a DAG, two different algorithms will be provided. The first is a greedy algorithm, while the second is a branch and bound-like algorithm. The greedy algorithm iteratively picks the (M)TVI that covers the maximum number of uncovered tasks, subject to schedule feasibility as given by Theorem 3. Under such a greedy scheme, the following is true:

Theorem 4. Given k cameras, the approximation factor for multi-camera scheduling using the greedy algorithm is $2+k\lambda\mu$, where the definitions of $\lambda$ and $\mu$ are given in the proof.

Proof. Let $G=\cup_{i=1\ldots k}G_i$, where $G_i$ is the set of (M)TVIs scheduled on camera i by the greedy algorithm, and $OPT=\cup_{i=1\ldots k}OPT_i$, where $OPT_i$ is the set of (M)TVIs assigned to camera i in the optimal schedule. Further defined are: (1) $H_1=\text{Å}_{i=1\ldots k}H_{1,i}$, where $H_{1,i}$ is the set of (M)TVIs for camera i that have been chosen by the optimal schedule but not the greedy algorithm and each of these (M)TVIs comprises tasks that are not covered by the greedy algorithm in any of the cameras, (2) $H_2=\cup_{i=1\ldots k}H_{2,i}$, where $H_{2,i}$ is the set of (M)TVIs for camera i that have been chosen by the optimal schedule but not the greedy algorithm and each of these (M)TVIs comprises tasks that are also covered by the greedy algorithm, and finally (3) $OG=OPT\cap G$. Clearly, $OPT=H_1\cup H_2\cup OG$. Then, for $h_{j=1\ldots n_i}\in H_{1,i}$, where $n_i$ is the number of (M)TVIs in $H_{1,i}$, $\exists g_{j=1\ldots n_i}\in G_i$ such that $h_j$ and $g_j$ cannot be scheduled together based on the requirement given in Theorem 3, else $h_j$ should have been included by G. If Tasks($h_j$) $\cap$Tasks($g_j$)=$\emptyset$, then $h_j$ contains only tasks that are not covered by G. In this case, $|h_j|\leq|g_j|$, else G would have chosen $h_j$, instead of $g_j$. Note that the cardinality is defined as the number of unique tasks covered. In the same manner, even if Tasks($h_j$)$\cap$Tasks($g_j$)$\neq\emptyset$, $h_j$ could have replaced $g_j$ unless $|h_j|\leq|g_j|$.

Consequently, $|H_{1,i}|=|h_1\cup h_2\cup\ldots\cup h_{n_i}|\leq|h_1|+|h_2|+\ldots|h_{n_i}|\leq|g_1|+|g_2|+\ldots|g_{n_i}|$. Let $$\beta_j = \frac{|g_j|}{|G_i|}$$

and $\lambda_i=\arg\max_j\beta_j*n_i$. This gives $|H_{1,i}|\leq\beta_1|G_i|+\ldots+\beta_{n_i}|G_i|\leq\lambda_i|G_i|$. Similarly, one knows that $|H_1|\leq\lambda_1|G_1|+\ldots+\lambda_k|G_k|\leq\lambda(|G_1|+\ldots+|G_k|)$, where $\lambda=\arg\max_i\lambda_i$. Introducing a new term, $$\gamma_j = \frac{|G_i|}{|G|}$$

and letting $\mu=\arg\max_i\gamma_i$, one gets $|H_1|\leq k\lambda\mu|G|$. Since $|H_2|\leq|G|$ and $|OG|\leq|G|$, $|OPT|\leq(2+k\lambda\mu)|G|$.

The branch and bound approach, on the other hand, runs DP in the same manner as single-camera scheduling, but an "upper bounding set" is associated with each source node that has one or more incoming edge from the sink node of another camera. The "upper bounding set" $S_s$ of source node s is defined as:

$$S_s = \bigcup_{c\in S_{link}} S_c \qquad (10)$$

where $S_{link}$ is the set of cameras of which paths starting from the corresponding sink nodes to s exist in the DAG; and $S_c$ is the set of all the tasks, each of which is covered by some (M)TVIs belonging to camera c.

Intuitively, such an approach aims to overcome the "short-sightedness" of the greedy algorithm by "looking forward" in addition to backtracking and using the tasks that can be covered by other cameras to influence the (M)TVI nodes chosen for a particular camera. It is also interesting to note that better performance might be achievable if "better" upper bounding sets are used, as opposed to just blindly using all the tasks that other cameras can cover without taking into consideration of scheduling feasibility. Of course, trying to do so might however incur more computational cost. To further illustrate the branch and bound algorithm, the following simple two-camera example will be considered. Consider two cameras, $c_1$ and $c_2$, and the following sets of (M)TVIs that have been constructed for them, again ordered by the slacks' start times and shown here by the tasks ($T_{1\ldots 4}$) they can satisfy:

$c_1$: {node$_1$={$T_1,T_2,T_3$},node$_2$={$T_3,T_4$}}, and $c_2$: {node$_3$={$T_1,T_2,T_3$}}.

The DAG that is constructed has two source-sink pairs, one for each camera. In FIG. 12, the source and sink pair, (Source$_1$, Sink$_1$), belongs to $c_1$ and (Source$_2$, Sink$_2$) to $c_2$. The camera sinks are connected to a final sink node as shown. Weights between (M)TVI nodes and camera sinks are determined on the fly as in single-camera scheduling. Directed edges from Sink$_2$ to Source$_1$ connects c1 to c2. As illustrated in FIG. 14, the DP algorithm is run in almost the same manner as in single-camera scheduling, except that at paths of length 3 from the final sink node, the link from Source$_1$ to node$_2$ is chosen because the upper bounding set indicates that choosing the link potentially covers a larger number of tasks (i.e., the upper bounding set of Source$_1$, {$T_1$, $T_2$, $T_3$} combines with the tasks covered by node$_2$ to form {$T_1,T_2,T_3,T_4$}). This turns out to be a better choice as compared to the results shown in FIG. 15, where no such upper bounding set was used.

FIGS. 14 and 15 provide dynamic tables for DAG of FIG. 12. Using the upper bounding set yields a solution that is optimal in FIG. 14 as opposed to FIG. 15. In FIG. 14, at distance of length 3 from the sink, the link chosen for Source$_1$ is to node$_2$ instead of node$_1$ since the union of the upper bounding set for Source$_1$ ({$T_1$, $T_2$, $T_3$} as given by Eqn. 10) with node$_2$ potentially has a larger task coverage.

The branch and bound method can be viewed as applying the single-camera DP algorithm, camera by camera in the order given in the corresponding DAG, with the schedule of one camera depending on its upper bounding set. In this sense, a potentially better bound can be derived as an aspect of the present invention as follows:

Theorem 5. For k cameras, the approximation factor of multi-camera scheduling using the branch and bound algorithm is $$\frac{(1+k\mu(1+u))^k}{(1+k\mu(1+u))^k - (k\mu(1+u))^k},$$

u is defined as follows. Let $G^* = \cup_{i=1...k} G_i^*$ where $G_i^*$ is the set of (M)TVIs assigned to camera i by the branch and bound algorithm. Define $u_i$ as the ratio of the cardinality of the upper bounding set of $G_i^*$ to $|G_i^*|$. Then $u = \mathrm{argmax}_i u_i$. In addition, $\mu$ is defined as $$\mathrm{argmax}_i \left| \frac{G_i^*}{G^*} \right|.$$

Proof. Let $\alpha$ be the approximation factor of the branch and bound algorithm. Then, assuming that schedules for $G_1^*, \ldots, G_{i-1}^*$ have been determined, $$|G_i^*| \geq \frac{1}{\alpha}\left(|OPT| - \sum_{j=1}^{i-1} |G_j^*|\right).$$

Adding $$\sum_{j=1}^{i-1} |G_j^*|$$

to both sides gives:

$$\sum_{j=1}^{i} |G_j^*| \geq \frac{OPT}{\alpha} + \frac{\alpha - 1}{\alpha} \sum_{j=1}^{i-1} |G_j^*|.$$

Proving by induction, shows that, after some manipulation:

$$\frac{\alpha^k}{\alpha^k - (\alpha-1)^k} \sum_{j=1}^{k} |G_j^*| \geq |OPT|.$$

Let $H = \cup_{i=1...k} H_i$, $H_i$ being the set of (M)TVIs chosen by the optimal schedule on camera i but not the branch and bound algorithm. The condition $|H_i| \leq |G_i^*| + u_i|G_i^*|$ is true; otherwise, $H_i$ would have been added to $G^*$ instead. Consequently, $|H| \leq |G_1^*| + \ldots + |G_k^*| + (u_1|G_1^*| + \ldots u_k|G_k^*|) \leq k\mu|G^*| + k u\mu|G^*| \leq k\mu(1+u)|G^*|$. Since OPT=OG∪H (Theorem 4), one arrives at $|OPT| \leq 1 + k\mu(1+u)|G^*|$. Thus, $\alpha = 1 + k\mu(1+u)$.

Both the single-camera and branch and bound multi-camera algorithm have an average case complexity of $O(N^3)$, N being the average number of (M)TVIs constructed for a given camera and used in the resulting DAG. The number of iterations (i.e., number of rows in the DP tables), depends on the number of cameras multiplied by N. This, together with an asymptotic cost of $O(N^2)$ checking possible backtracking paths at each iteration gives $O(N^3)$. Clearly, this means that one advantage of employing the greedy multi-camera algorithm is its faster computational speed of $O(N^2)$.

Results

Figure 16:
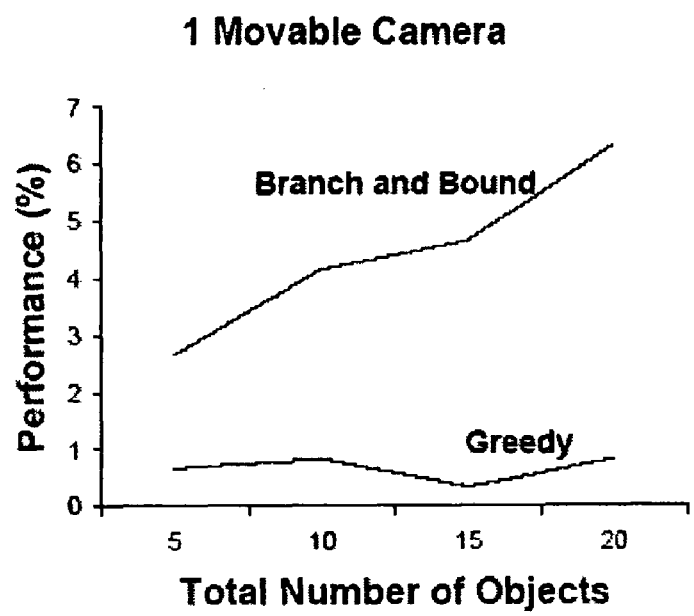
FIG. 16 is a camera performance graph.
Figure 17:
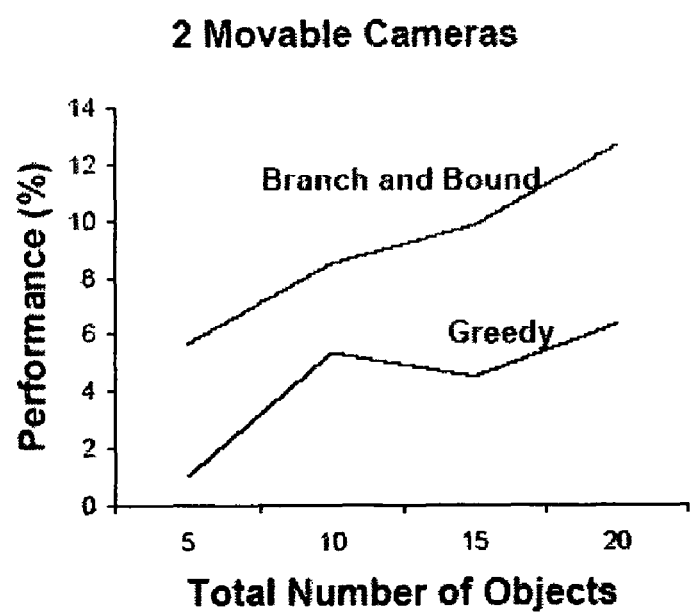
FIG. 17 is a multi-camera performance graph.
Figure 18:
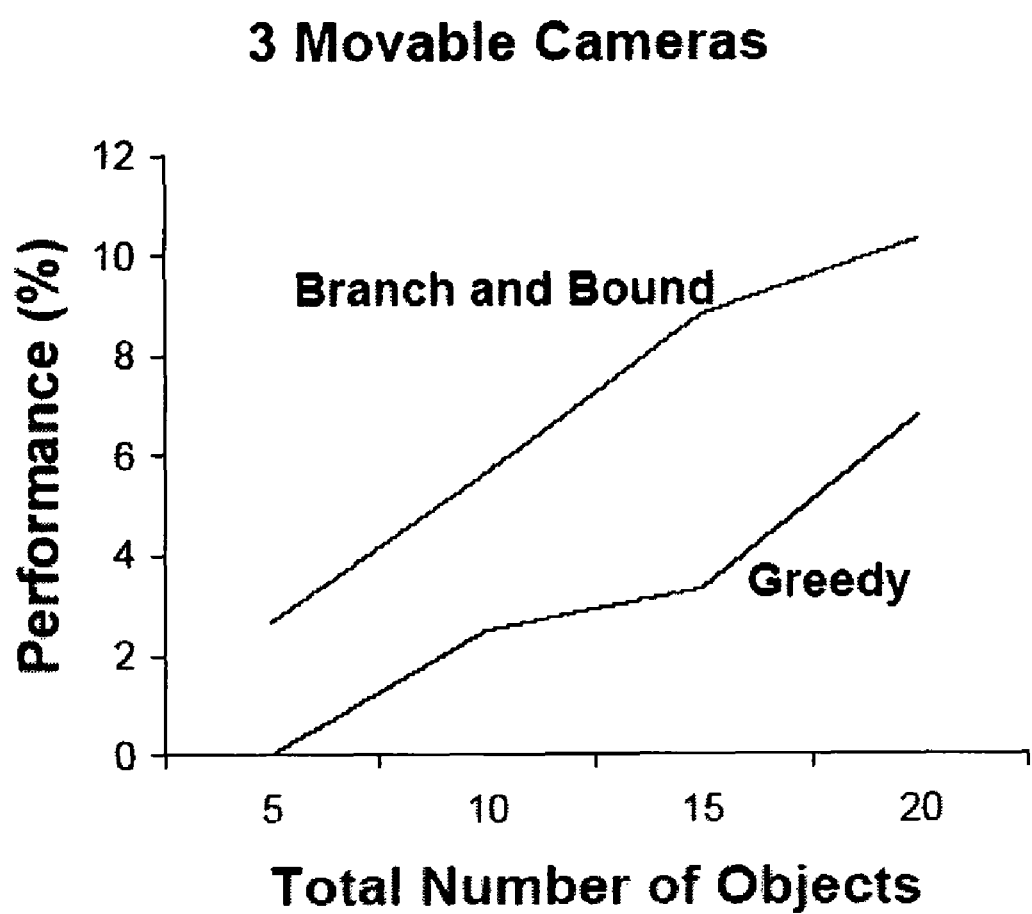
FIG. 18 is another multi-camera performance graph.

The performance of the branch and bound algorithm in comparison to the greedy algorithm depends on u and k as shown in Theorem 5. Extensive simulations have been conducted to compare their performance—600 simulations were conducted each time based on 5, 10, 15 and 20 objects for 1, 2 and 3 cameras respectively, and the percentage of these simulations whereby the branch and bound algorithm outperforms the greedy one (and vice versa) is recorded. The results are shown in FIGS. 16, 17 and 18 for 1, 2 and 3 cameras respectively. In all the simulations, the branch and bound algorithm clearly outperforms the greedy one, even though the condition ($|\delta_{max}| < p_{min}$) in Theorem 2 was not enforced.

FIGS. 16, 17 and 18 illustrate the simulations conducted here which do not enforce the condition ($|\delta_{max}| < p_{min}$) in Theorem 2. The branch and bound algorithm still clearly outperforms the greedy one. The plots record the percentage of time when the branch and bound algorithm outperforms the greedy one (labeled as "Branch and Bound") and vice versa (labeled as "Greedy"). Ties are not shown.

Real-time experiments were also conducted with a prototype multi-camera system which is capable of constructing (M)TVIs and scheduling cameras based on them. It comprises four PTZ cameras, synchronized by a Matrox four-channel card. One camera is kept static, so that it can be used for background subtraction and tracking. The system recovers an approximate 3D size estimate of each detected object from ground plane and camera calibration, and uses them to construct (M)TVIs, which are then assigned to cameras using the multi-camera scheduling algorithm which is one aspect of the present invention. Due to the lack of exact future information, the system also updates the schedules as new observations are made by combining the predicted motion trajectories with the measured ones probabilistically.

Figure 19:
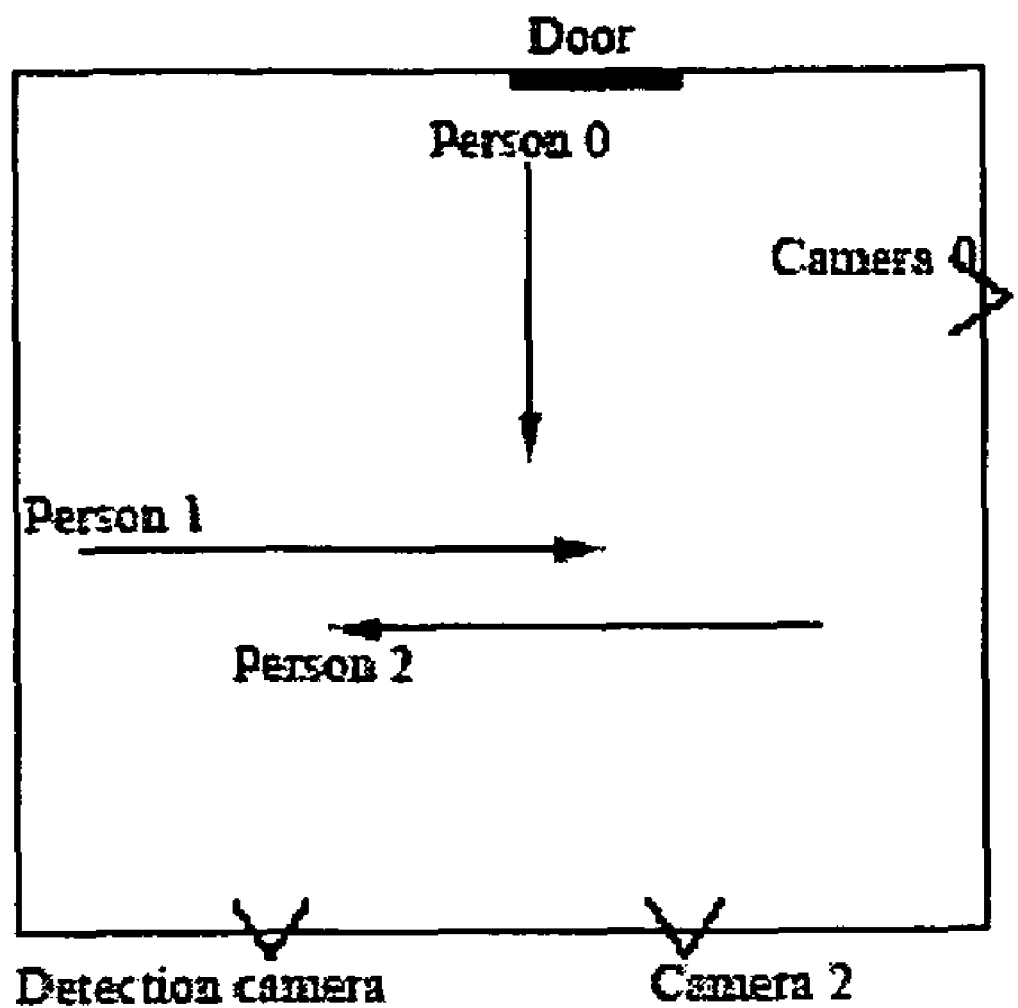
FIG. 19 is a diagram of a camera set-up.
Figure 20:
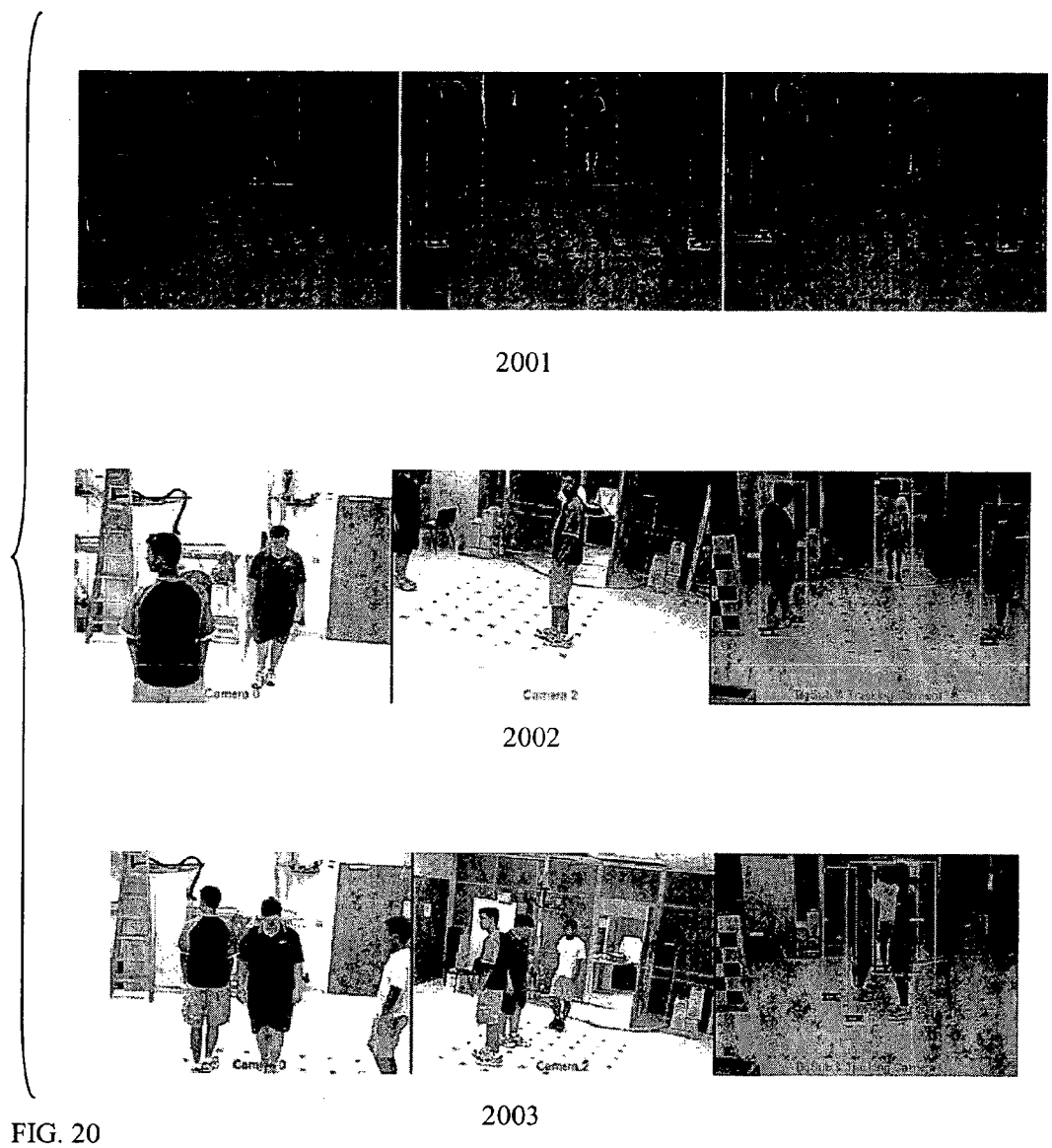
FIG. 20 show captured images.

FIG. 19 shows in diagram the working of the system. FIG. 20 shows the acquisition of the motion models in 2001 to the video captures in 2002 and 2003, where the system's capabilities in dealing with occlusions and merging foreground blobs are also demonstrated. The diagram in FIG. 19 shows two movable cameras and one detection camera were used for the experiments in the video captures of 2001, 2002 and 2003. Images 2001: Left to right: A plan view of the predicted motion models, and sample frames used for constructing the motion model of each object. Images 2002: Person 0 was occluded by the door from camera 0's view and by person 2 from camera 2's view. Thus, only person 1 and 2 were assigned to camera 0 (leftmost image) and 2 (middle image) of 2002 respectively. The rightmost image is from the detection camera, as one can see from the boxes around detected objects. Images 2003: Person 0 is finally visible and assigned to camera 2 together with person 2. The merging of foreground blobs was prevented by utilizing the predicted positions of the people. Note that the camera label in each bounding box indicates the camera that was assigned to capture the person.

Figure 21:
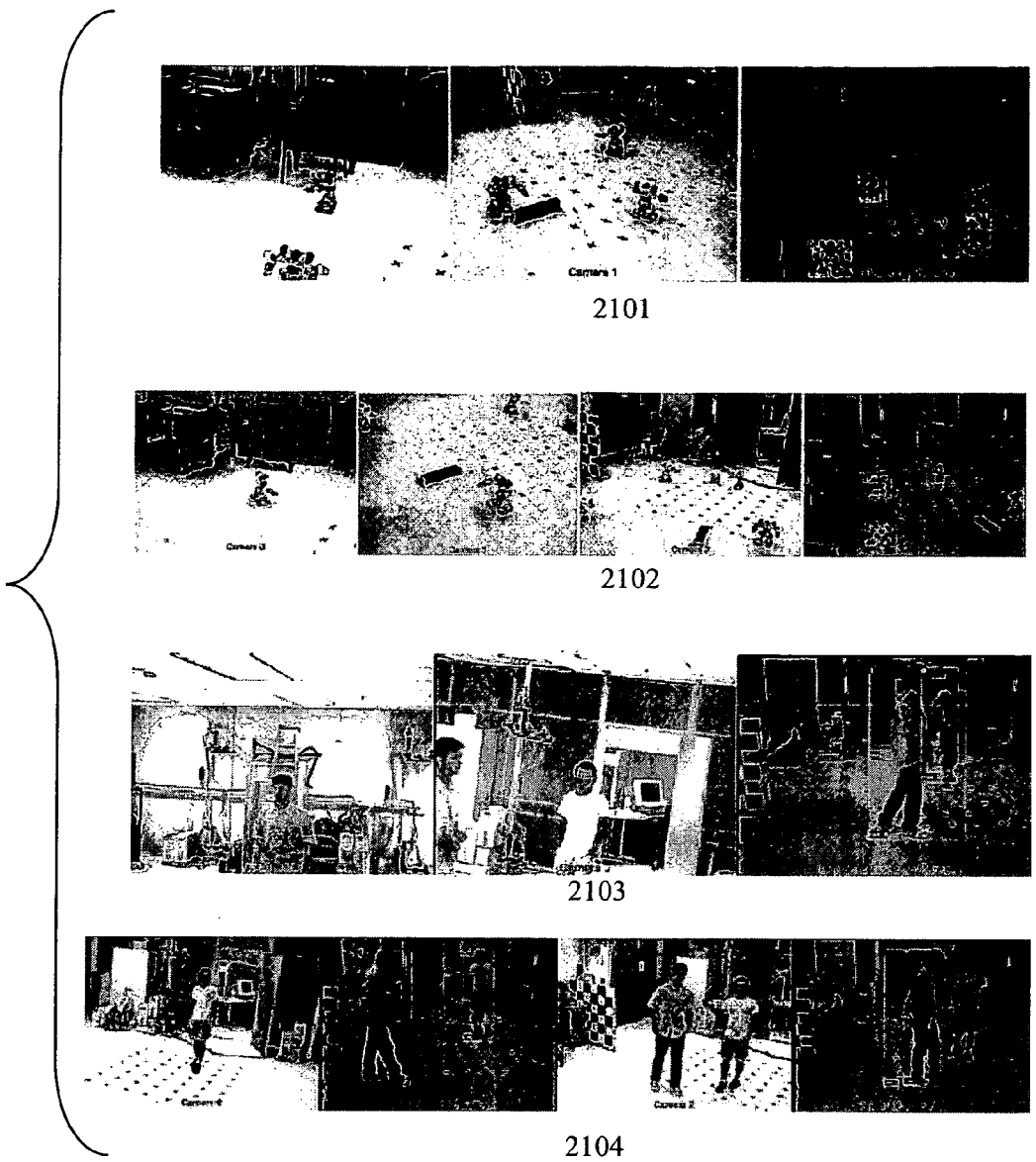
FIG. 21 show other captured images.

In FIG. 21 images 2101 and 2102, the effect of changing resolution requirement on the (M)TVIs constructed, using four remote-controllable 12×14 inches robots, are shown. As one increases the resolution requirement, while only two cameras are needed to capture the four robots in 2101, three were needed in 2102. The system's capabilities in scheduling specific tasks are further shown in 2103 and 2104, where tasks involving captures of faces and close interactions between objects are demonstrated. In FIG. 21 images 2101 two cameras are needed (one TVI for camera 0 shown in the leftmost image, and one MTVI with three tasks for camera 1, shown in the second image from the left) to capture the four robots. The rightmost image is the detection camera which one can also notice from the boxes around detected objects. In images 2102 the resolution requirement was increased, and three cameras are now needed—one TVI for camera 0 and 1 and one MTVI with two tasks for camera 2, shown sequentially from left to right. In 2103, the motion models of two persons in the scene were used to determine TVIs when they are front-facing to the assigned camera (two movable cameras are used here), so that their faces are visible in the capture videos. This is clearly illustrated in the leftmost and middle image, since each person is front-facing to only one of the movable cameras, which was then assigned to the task accordingly. In 2104, one movable camera was used and two persons are walking in the scene. The leftmost image of 2104 shows the camera being assigned to one of the persons in the scene. However, the motion models of the two persons were used by the system to predict that there is a high likelihood of the two persons interacting—a task which was scheduled and captured accordingly, shown in the third image from the left.

SUMMARY

A multi-camera system that constructs (M)TVIs for deciding suitable time intervals for data acquisition is provided as an aspect of the present invention. By constructing these (M)TVIs, the system can ensure (probabilistically, based on predicted and observed motion model), that targeted objects in acquired videos are unobstructed, in the field of view, and meet task-specific resolution requirements. Following the construction of (M)TVIs, a collection of cameras are to be scheduled for video collection so as to maximize the coverage of tasks. Several computationally feasible scheduling algorithms, both for single and multiple cameras have been provided as another aspect of the present invention. Such a system is useful in surveillance, where extensive camera planning and scheduling is necessary.

Figure 22:
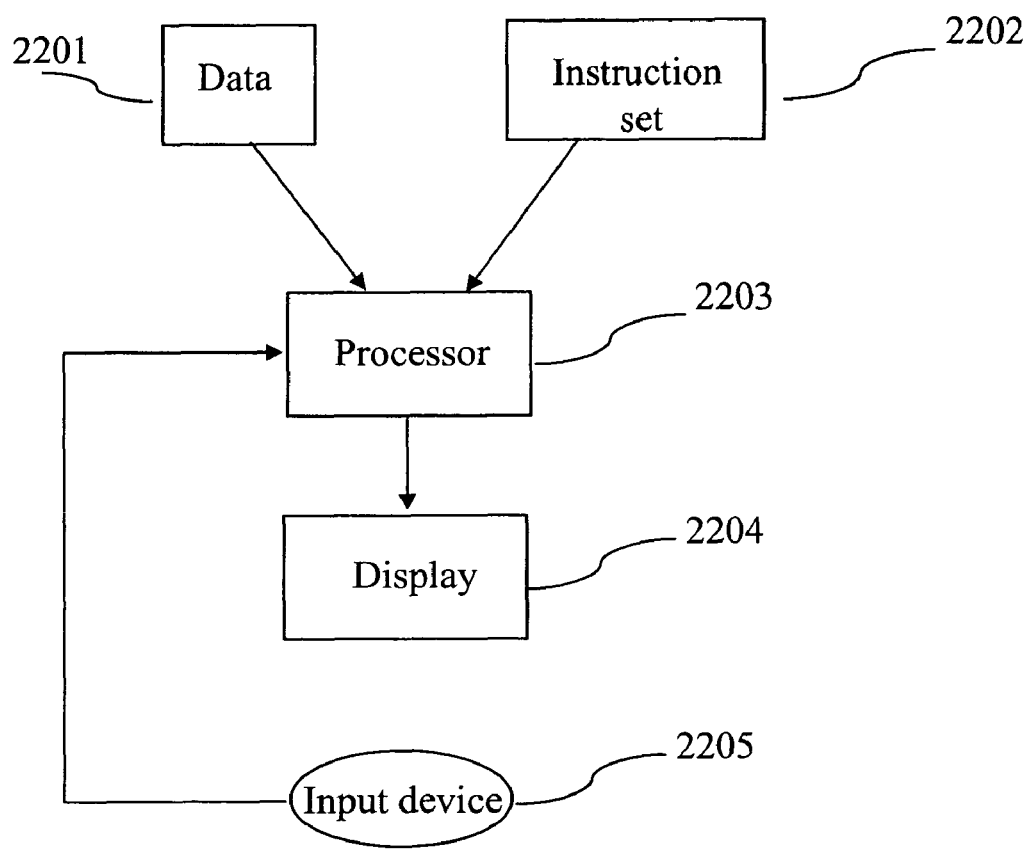
FIG. 22 is a diagram of a system according to one aspect of the present invention.

The (M)TVI methods that are part of the present invention can be executed by a system as shown in FIG. 22. The system is provided with data 2201 representing image data. The data may for instance be provided real-time by a plurality of video cameras. An instruction set or program 2202 executing the methods of the present invention is provided and combined with the data in a processor 2203, which can process the instructions of 2202 applied to the data 2201 and show a resulting image or image frame sequence on a display 2204, and for instance highlighting a tracked image object. The processor can be dedicated hardware. However, the processor can also be a CPU or any other computing device that can execute the instructions of 2202. An input device 2205 like a mouse, or track-ball, a key-board or other input device may be included in the system and may allow a user to initiate a process. Accordingly the system as shown in FIG. 22 provides a system for task driven video collection as disclosed in the present invention.

The following references provide background information generally related to the present invention and are hereby incorporated by reference: [1]. K. A. Tarabanis, P. K. Allen, and R. Y. Tsai, "A survey of sensor planning in computer vision," *IEEE Transactions on Robotics and Automation*, vol. 11, no. 1, pp. 86-104, 1995. [2]. Cregg K. Cowan and Peter D. Kovesi, "Automatic sensor placement from vision task requirement," *IEEE Transactions on Pattern Analysis and machine intelligence*, vol. 10, no. 3, pp. 407-416, 1988. [3] I. Stamos and P. Allen, "Interactive sensor planning," in *Computer Vision and Pattern Recognition Conference*, June 1998, pp. 489-494. [4]. Steven Abrams, Peter K. Allen, and Konstantinos A. Tarabanis, "Dynamic sensor planning.," in *ICRA* (2), 1993, pp. 605-610. [5] Steven Abrams, Peter K. Allen, and Konstantinos Tarabanis, "Computing camera viewpoints in an active robot work cell," *International Journal of Robotics Research*, vol. 18, no. 2, February 1999. [6] K. A. Tarabanis, R. Y. Tsai, and P. K. Allen, "The mvp sensor planning system for robotic vision tasks," *IEEE Transactions on Robotics and Automation*, vol. 11, no. 1, pp. 72-85, February 1995. [7] Anurag Mittal and Larry S. Davis, "Visibility analysis and sensor planning in dynamic environments," in *European Conference on Computer Vision*, May 2004. [8] K. N. Kutulakos and C. R. Dyer, "Global surface reconstruction by purposive control of observer motion," in *IEEE Conference on Computer Vision and Pattern Recognition, Seattle, Wash., USA*, June 1994. [9] K. N. Kutulakos and C. R. Dyer, "Occluding contour detection using affine invariants and purposive viewpoint control," in *IEEE Conference on Computer Vision and Pattern Recognition, Seattle, Wash., USA*, June 1994. [10] K. N. Kutulakos and C. R. Dyer, "Recovering shape by purposive viewpoint adjustment," *International Journal of Computer Vision*, vol. 12, no. 2, pp. 113-136, 1994. [11] K. N. Kutulakos, "Affine surface reconstruction by purposive viewpoint control," in *International Conference on Computer Vision, Boston, Mass., USA*, June 1995. [12] S. K. Yi, R. M. Haralick, and L. G. Shapiro, "Optimal sensor and light-source positioning for machine vision," *Computer Vision and Image Understanding*, vol. 61, no. 1, pp. 122-137, 1995. [13] R. I. Hartley and A. Zisserman, *Multiple View Geometry in Computer Vision*, Cambridge University Press, ISBN: 0521623049, 2000.

While there have been shown, described and pointed out fundamental novel features of the invention as applied to preferred embodiments thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

The invention claimed is:

1. A method for processing a plurality of vision tasks on a plurality of objects by a plurality of cameras with pan tilt zoom (PTZ) settings in a vision system, comprising:
   determining the plurality of vision tasks to be performed by a processor for each of the plurality of objects;
   determining PTZ settings of a camera for the processor to perform a vision task on an object;
   determining a vision task visibility interval (TVI) for a camera in the plurality of cameras for the processor to perform one vision task or multiple vision tasks (MTVI) using the PTZ settings;
   assigning the camera in the plurality of cameras to a TVI or MTVI;
   creating a Directed Acyclic Graph DAG wherein each MTVI and TVI is a node;
   defining a sink node-source node pair for a camera;
   connecting a sink node to one final sink node;
   connecting a source node with outgoing edges to corresponding MTVIs and TVIs;
   connecting a sink node with incoming edges from corresponding MTVIs and TVIs;
   defining an upper bounding set for each source node corresponding to a camera that has an incoming edge from a sink node corresponding to a different camera; and
   applying dynamic programming to the DAG for determining a schedule.

2. The method as claimed in claim 1, wherein atomic TVIs are constructed comprising:
   determining for each of the plurality of cameras temporal intervals during which an object remains unobstructed and within a field of regard of the camera; and
   determining within the temporal intervals atomic intervals wherein vision task specific camera settings exist for an object within a field of regard.

3. The method as claimed in claim 2, wherein atomic TVIs of different vision tasks are combined into a Multiple Tasks Visibility Interval (MTVI) for a camera.

4. The method as claimed in claim 3, wherein all MTVIs for a camera are determined by applying a plane sweep algorithm.

5. The method as claimed in claim 1, for scheduling of one camera based on a determined set of MTVIs and atomic TVIs to optimize coverage of vision tasks, comprising:
   creating a Directed Acyclic Graph (DAG) wherein each MTVI and TVI is a node;
   connecting a source node with outgoing edges to each MTVI and TVI;
   connecting a sink node with incoming edges from each MTVI and TVI; and
   applying dynamic programming to the DAG for determining a schedule.

6. The method as claimed in claim 1, for scheduling of a plurality of cameras based on a determined set of MTVIs and atomic TVIs to optimize coverage of vision tasks, comprising:
   applying a greedy algorithm by iteratively selecting an MTVI or TVI that covers a maximum number of uncovered vision tasks.

7. A system for processing a plurality of vision tasks on a plurality of objects by a plurality of cameras with pan tilt zoom (PTZ) settings in a vision system, comprising:
   a processor;
   software operable on the processor to:
      determining the plurality of vision tasks to be processed for each of the plurality of objects;
      determining PTZ settings of a camera for the processor to perform a vision task on an object;
      determining a vision task visibility interval (TVI) for a camera in the plurality of cameras for the processor to perform one vision task or multiple vision tasks in a multiple vision task visibility interval (MTVI) using the PTZ settings;
      assigning the camera in the plurality of cameras to a TVI or MTVI;
      creating a Directed Acyclic Graph DAG wherein each MTVI and TVI is a node;
      defining a sink node-source node pair for a camera;
      connecting a sink node to one final sink node;
      connecting a source node with outgoing edges to corresponding MTVIs and TVIs;
      connecting a sink node with incoming edges from corresponding MTVIs and TVIs;
      defining an upper bounding set for each source node corresponding to a camera that has an incoming edge from a sink node corresponding to a different camera; and
      applying dynamic programming to the DAG for determining a schedule.

8. The system as claimed in claim 7, wherein atomic TVIs are constructed comprising:
   determining for each of the plurality of cameras temporal intervals during which an object remains unobstructed and within a field of regard of the camera; and
   determining within the temporal intervals atomic intervals wherein vision task specific camera settings exist for an object within a field of regard.

9. The system as claimed in claim 8, wherein atomic TVIs of different vision tasks are combined into a Multiple Tasks Visibility Interval (MTVI) for a camera.

10. The system as claimed in claim 9, wherein all MTVIs for a camera are determined by applying a plane sweep algorithm.

11. The system as claimed in claim 7, for scheduling of one camera based on a determined set of MTVIs and atomic TVIs to optimize coverage of vision tasks, comprising:
   creating a DAG wherein each MTVI and TVI is a node;
   connecting a source node with outgoing edges to each MTVI and TVI;
   connecting a sink node with incoming edges from each MTVI and TVI; and
   applying dynamic programming to the DAG for determining a schedule.

12. The system as claimed in claim 7, for scheduling of a plurality of cameras based on a determined set of MTVIs and atomic TVIs to optimize coverage of vision tasks, comprising:
   applying a greedy algorithm by iteratively selecting an MTVI or TVI that covers a maximum number of uncovered vision tasks.

13. A method for processing a plurality of vision tasks on a plurality of objects by a plurality of cameras with pan tilt zoom (PTZ) settings in a vision system, comprising:
   for each of the plurality of objects determining the plurality of vision tasks to be performed on a processor;
   determining constraints a camera must meet for the processor to perform a vision task in the plurality of vision tasks on an object using an image from the camera;
   determining a vision task visibility interval (TVI) for a camera in the plurality of cameras meeting the constraints that allows the camera to be scheduled to a vision task in the plurality of vision tasks;
   assigning each of the plurality of vision tasks in the plurality of vision tasks to a camera in the plurality of cameras in accordance with the constraints of the vision task and a vision task visibility interval, wherein a camera is enabled to be assigned to more than one vision task;
   creating a Directed Acyclic Graph DAG wherein each MTVI and TVI is a node;
   defining a sink node-source node a for a camera;
   connecting a sink node to one final sink node;
   connecting a source node with outgoing edges to corresponding MTVIs and TVIs;
   connecting a sink node with incoming edges from corresponding MTVIs and TVIs;
   defining an upper bounding set for each source node corresponding to a camera that has an incoming edge from a sink node corresponding to a different camera; and
   applying dynamic programming to the DAG for determining a schedule.

* * * * *